US006183191B1

(12) United States Patent
Mondie et al.

(10) Patent No.: US 6,183,191 B1
(45) Date of Patent: Feb. 6, 2001

(54) METHOD AND SYSTEM FOR SORTING FLAT ARTICLES

(75) Inventors: George R. Mondie, Bedford; Gerald A. Isaacs, Arlington; Morgan H. Dunn, Dallas, all of TX (US)

(73) Assignee: Siemens ElectroCom, L.P., Arlington, TX (US)

(*) Notice: Under 35 U.S.C. 154(b), the term of this patent shall be extended for 0 days.

(21) Appl. No.: 09/169,467

(22) Filed: Oct. 9, 1998

Related U.S. Application Data

(63) Continuation-in-part of application No. 09/058,644, filed on Apr. 10, 1998.
(60) Provisional application No. 60/043,775, filed on Apr. 11, 1997.

(51) Int. Cl.[7] .......... B65G 1/06
(52) U.S. Cl. .......... 414/807; 414/417; 414/280
(58) Field of Search .......... 414/411, 417, 414/278, 280, 807; 198/412

(56) References Cited

U.S. PATENT DOCUMENTS

| | | | | |
|---|---|---|---|---|
| 4,718,810 | * | 1/1988 | Hoehn et al. | 414/278 X |
| 5,009,321 | | 4/1991 | Keough | 209/3.1 |
| 5,042,667 | | 8/1991 | Keough | 209/3.1 |
| 5,143,225 | | 9/1992 | Rabindran et al. | 209/584 |
| 5,190,282 | | 3/1993 | Rabindran et al. | 271/272 |
| 5,363,971 | | 11/1994 | Weeks et al. | 209/584 |
| 5,385,243 | * | 1/1995 | Jackson et al. | 414/280 X |
| 5,405,232 | * | 4/1995 | Lloyd et al. | 414/280 |
| 5,558,483 | * | 9/1996 | Masuda | 414/278 |
| 5,599,154 | * | 2/1997 | Holscher et al. | 414/278 |
| 5,810,540 | * | 9/1998 | Castaldi | 414/280 |
| 5,833,076 | | 11/1998 | Harres et al. | 211/51 |
| 5,857,830 | | 1/1999 | Harres et al. | 414/798.9 |
| 5,947,468 | | 9/1999 | McKee et al. | 271/210 |
| 5,993,132 | | 11/1999 | Harres et al. | 414/417 |
| 6,026,967 | | 2/2000 | Isaacs et al. | 209/539 |

* cited by examiner

*Primary Examiner*—Steven A. Bratlie
(74) *Attorney, Agent, or Firm*—Philip G. Meyers; Philip G. Meyers Intellectual Property Law, P.C.

(57) ABSTRACT

A flat article turntable for use in a flat article sorting system having a flat article holding cartridge, a cartridge handling mechanism and an automatic flat article feeder is provided with an empty cartridge presentation mechanism for presenting empty cartridges to a cartridge handling system. A full cartridge acceptor mechanism for receiving full cartridges from the cartridge handler system. A rotary mechanism is provided for rotating a full cartridge 90°. An index mechanism is provided to matingly index the cartridges with the automatic feeder of the sorting system. An extraction mechanism is provide including a cartridge opener for opening the cartridge. A pushing mechanism is operatively connected for pushing stacked articles from the cartridge. A pause mechanism is interconnected to allow a finger on the automatic feeder to take the stacked articles, and a closing mechanism is attached to close the cartridge. A rotating mechanism rotates the cartridge back to face the cartridge handler and an index mechanism indexes the empty cartridge from an active to a passive side of the turntable.

9 Claims, 26 Drawing Sheets

METHOD AND SYSTEM FOR SORTING FLAT ARTICLES

CROSS-REFERENCE TO RELATED APPLICATIONS

This application is a continuation in part of U.S. patent application Ser. No. 09/058,644, filed Apr. 10, 1998, incorporated herein by reference, which application was a conversion from U.S. Provisional Application Ser. No. 60/043,775 filed Apr. 11, 1997, incorporated herein by reference and relied upon for priority.

TECHNICAL FIELD OF THE INVENTION

The present invention relates to automated sorting and handling of flat articles, and particularly to automated feeding to and removal of flat articles from a sorting or other flat article processing machine.

BACKGROUND OF THE INVENTION

Machines for automatically sorting flat articles, such as mail, into one of an array of selected bins or compartments, are known. Typically, such sorting machines have a feeding station, including an intake drive member such as a rubber-covered wheel or belt, sensing and detecting equipment for determining the appropriate output compartment for the article to be sorted, diverting gates or other article directing mechanisms and an array of output compartments or bins for the sorted articles. An example of an advanced sorting machine is the DBSCII sorting device, available from Siemens ElectroCom, L.P., Arlington, Tex.

Conventionally, to feed articles into the sorting machine, an operator manually grabs a bundle of mail to be sorted and manually shakes or jostles the mail to generally align the bottom edges, making a stack, typically horizontal. The operator then places the stack of mail against the feed member of the sorting machine. The feed member then feeds the articles into the sorting machine, one at a time, to be sorted in the sorting machine.

At the output of the sorting machine, the sorted articles are routed to the appropriate receiving compartments or bins where the sorted articles are stacked. The feeding and sorting of articles continues until one or more of the receiving compartments become sufficiently full of a stack of sorted articles or mail. When the receiving compartment is full, an operator manually removes a stack of the sorted articles from the full compartment and places the stack of articles into a box. This removal of stacked articles may be termed "sweeping" of the compartment. The stack of sorted articles placed by the operator into a box may be further reprocessed through the same sorting machine, may be transferred to another sorting machine for additional sorting or may be transported to a delivery person, such as a mail carrier, or may be transmitted for ultimate delivery to the intended location, address or recipient when all desired sorting is completed.

Although automatic sorting machines have greatly speeded and improved prior processes for manual article sorting, manual attention is still required to feed the flat articles or the mail into the sorting machine and also to sweep and retrieve the sorted and stacked articles from the output of the sorting machine. The need for such manual feeding and sweeping is undesirable for ergonomic reasons, because of the bending and reaching required of humans to perform these tasks. Furthermore, the need for such manual handling of mail articles tends to limit the maximum benefits of automation that can be gained from the automatic sorting machines.

OBJECTS OF THE INVENTION

It is an object of the present invention to provide a flat article sorting cartridge designed to contain flat articles as mail and to interface with article or mail sorting machines for the purpose of automatic stacking of the flat articles or mail and containment of the articles or mail away from the sorting machines.

It is a further object of the present invention to provide a mail cartridge which has structural features to facilitate manipulation by humans, as well as manipulation by a robotic cartridge handler.

It is a further object of the present invention to provide a mail cartridge designed to allow quick insertion and extraction from an interface mechanism attached to a sorting machine.

It is a further object of the present invention to provide a flat article cartridge having all movable parts activatable by an end-effector mounted on an X-Y transport robotic system. The moving parts and flat article cartridge mechanisms can also be manipulated by equipment operators, if necessary.

It is a further object of the invention to provide an assembly for a flat article cartridge with individual components arranged, attached and connected so that they cannot be loosened. The cartridge can contain from about zero to about 18 inches of stacked flat articles or mail.

It is a further object of the invention to provide a flat article cartridge which is constructed of a small number of parts.

It is a further object of the invention to provide a flat article cartridge constructed of a durable plastic material manipulatable by automatic conveyor tracks and also manipulatable by hand having a metallic drop gate which functions both to hold stacked articles in place and to provide additional rigidity. The plastic material is desirably selected to have reduced static electricity, reduced frictional characteristics and capabilities of performing in adverse and extreme ambient temperature and humidity conditions.

It is a further object of the invention to provide a mail stack supporter panel inside of the cartridge body designed to pre-bias flat articles while the cartridge is being filled and engaged along a locking bar spring-loaded against the articles as the cartridge is filled with stacked articles for mail.

It is a further object of the invention to provide a stacker interface mechanism for carrying flat article cartridges in a cradle arrangement so that they may be properly moved and seated for receiving mail from a sorter. The stacker interface advantageously houses a linear bearing and shuttle that act together to guide a stack support panel or plate into the cartridge when the cartridge and the interface are mated.

It is a further object of the invention to provide a 90° rotation turntable for automatically conveying stacked articles to an automatic feeder of the sorting machine and mail cartridges carried by a mail cartridge handler device. The cartridges are carried and moved in vertical and horizontal (X-Y) movement directions and are placed into and received from desired locations in one of a plurality of stacker modules for subsequent retrieval, reprocessing, or delivery of the stacked articles to the automatic feeder and sorter as desired. The turntable is also provided with a cartridge gate opening and closing mechanism to appropriately open the gates to receive stacked mail and to close the gates to contain the stacked mail. Preferably the turntable is also provided with an extraction mechanism that works in cooperation with a gate opener and closer. Preferably the turntable is further provided with an index mechanism for appropriately locating full or emptied cartridges to or from an active side and a passive side of the turntable as the stacked articles are transferred to the turntable and the sorting mechanism.

A further object is to provide an automatic feeder drawbridge which includes a plate to close a small gap between cartridges held in the turntable and the automatic feeder.

It is also an object of the invention to provide an end-effector carried in a mail cartridge handler or robot. The mail cartridge handler positions the end-effector in the vertical and horizontal (X-Y) planes of movement. The end-effector functions to pull or insert a cartridge from an automatic sorting machine, from a storage module, from a storage buffer cart, from an automatic feeder interface, or from a conveyor system, and automatically sweeps the flat articles or mail into and out of the cartridges.

SUMMARY OF THE INVENTION

The present invention provides a method for sorting flat articles into two or more pockets, each pocket having a removable cartridge. The method comprises the steps of loading a sort plan and then, for each flat article, selecting one of the removable cartridges to receive the flat article. The flat article is then routed by a sorter to the selected removable cartridge. Whenever one of the removable cartridges become substantially full, an empty cartridge is located in a buffer having an array of cartridges, the empty cartridge is removed, the substantially full cartridge is removed from the pocket, and the empty cartridge is inserted into the pocket. The substantially full cartridge is then inserted into the buffer. If multiple sorting passes are required, cartridges containing flat articles such as mail can be moved to a separate area of the buffer during a purge during which sorting is suspended, and the sorting process can be repeated using a different sort plan as needed to accomplish an elaborate sort scheme, such as dividing up mail having a common zip code by postal carrier and within each postal carrier group in delivery address order. An apparatus for carrying out the foregoing process features a high speed ASRS robot capable of keeping pace with the rate at which cartridges fill up with sorted articles.

According to additional aspects of the invention, the present invention provides a flat article cartridge turntable is provided for use in a mail cartridge handler system. The turntable includes an empty cartridge presentation mechanism presenting empty cartridges to the cartridge handling system. A full cartridge acceptor mechanism is provided for receiving full cartridges from the cartridge handler system. A rotary mechanism is provided for rotating the full cartridge 90° in a horizontal plane when it is received. An index mechanism is provided for matingly indexing the cartridges with an automatic feeder of the cartridge handler system. An extraction mechanism is operatively connected with the turntable having a cartridge opener for opening a gate on the cartridge. A pushing mechanism is provided for pushing a stack support panel so that a bundle of stacked articles is mechanically pushed from the cartridge. A pause mechanism is provided for allowing a finger on the automatic feeder to take a bundle of stacked articles pushed from the cartridge. A closing mechanism is provided to close the wire gate on the cartridge. A return index mechanism is also operatively connected to the turntable for rotating the cartridge back to 90° to face the cartridge handler and for indexing the empty cartridge from an active side of the turntable to the passive side of the turntable. The unique turntable is designed to convey flat articles such as mail in carrier cartridges and to interface with article or mail sorting machines for the purpose of automatic movement of the flat articles or mail and for holding and transporting of the articles or mail away from the sorting machines. The turntable is useful with a flat article cartridge and is constructed to allow and yet reduce manipulation by humans and to facilitate efficient and speedy manipulation by automatic or robotic cartridge handlers. The design allows quick insertion and extraction from an interface mechanism attached to transport and storage devices.

A cartridge for holding a stack of flat articles for use with a sorting machine for purposes of automatic stacking of flat articles is provided with a cartridge body having a bottom, side walls, a back wall, and an open front. A locking bar is positioned along the bottom of the cartridge body extending from the back wall towards the open front. A wire drop gate is pivotably mounted to the cartridge body and is pivotable between a blocking or closed position and an open position in the front of the cartridge body. A latch mechanism is connected to the cartridge body and is engagable with the wire drop gate for releaseably locking the wire gate in the blocking position. A mail stack support panel or support plate is slideably mounted along the bottom of the cartridge body, particularly along the locking bar. The support panel has front ribs and is spring loaded to pre-bias the stacked articles while the cartridge is being filled, and has a locking insert for engagement with the locking bar positioned along the bottom of the cartridge body. Receptacles are provided to hold the drop gate across the front opening and for strengthening the corners of the cartridge during transport. The cartridge body is constructed for stacking on top of another cartridge when empty. A locking bar is provided along the bottom of the cartridge for carrying a support panel or plate to engage with the stacked articles and to thereby maintain the integrity of the stack of flat articles during transport. The cartridge body is constructed with proper friction characteristics for the flat article sliding and particularly for mail and envelope sliding. Material construction has proper static electricity conductivity to reduce static build-up and static electricity binding between the stacked articles and the cartridge.

A stacker interface is provided for use in a mail sorting machine for holding a flat article cartridge in a proper position for receiving mail from the mail sorter. The mail stacker interface is provided with a cradle for holding the cartridge properly seated to receive mail from a sorter. Limit switches are attached to the cradle for detecting the presence of the cartridge and for detecting when the cartridge is full. A sweep gate is operatively connected to the stacker interface for guiding mail into the cartridge and has a linkage engageable with the mail sorting machine to activate the sweep gate. A linear bearing and shuttle guide is positioned in the cradle for engagement with a moveable stack support panel of the cartridge when the cartridge is held in the cradle. A latch mechanism is operatively connected to the lineal bearing rod so that the linear bearing rod may be retracted to perform maintenance on the stacker interface.

An end-effector machine is provided for handling stacked article cartridges and for interacting with a stacker interface mechanism in a mail cartridge handler system. The end-effector machine is provided with an engagement mechanism between a mail cartridge handler and the end-effector so that the mail cartridge handler positions the end-effector at a desired location in a vertical or a horizontal direction. A pair of actuators are positioned in the end-effector side-by-side to service two mail cartridges simultaneously and independently. A pull and insert mechanism is provided for automatically pulling or inserting cartridges from an automatic sorting machine, from storage buffer carts, from an automatic feeder, or from a conveyor system. A sweep mechanism is provided and it activatable with a stacker interface mechanism to move a stack of flat articles into a mail cartridge. A cartridge gate opening mechanism is provided for opening and closing a drop gate form in the mail cartridge. A mating mechanism is provided for forcing a support paddle of a mail cartridge into mating engagement with a linear bearing rod of a stacker interface mechanism. A tilting mechanism is further provided for tilting the mail cartridges as necessary to align the cartridges with the automatic sorting machine, the storage buffer cart or the automatic feeder interface, as the case may be.

BRIEF DESCRIPTION OF THE DRAWINGS

These and other objects and advantages, and a more complete understanding of the present invention and the advantages thereof, may be had with reference to the following drawings, disclosure and claims provided herein in which:

DETAILED DESCRIPTION OF THE PREFERRED EMBODIMENTS

Figure 1:
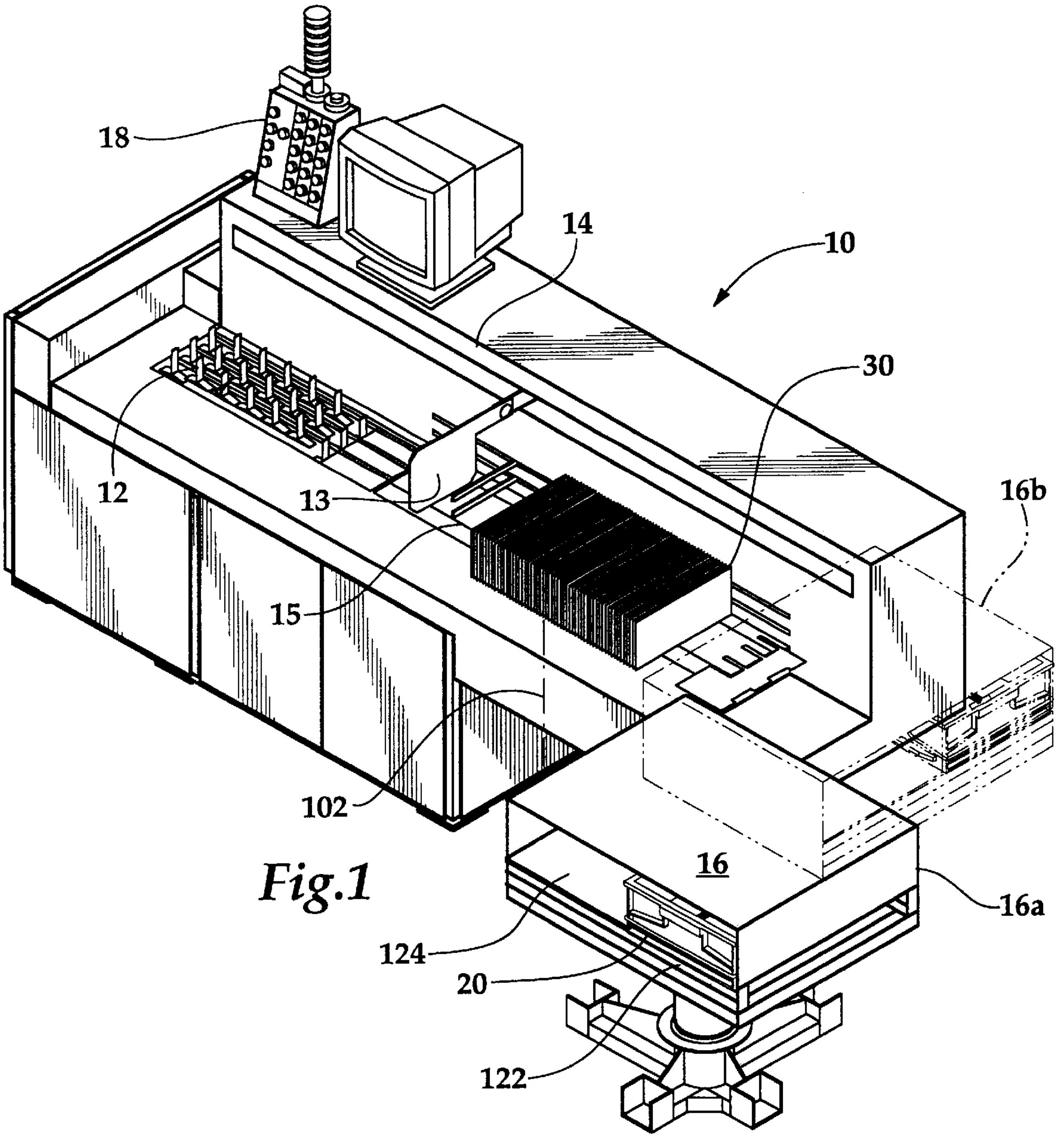
FIG. 1 is a perspective view of one mail cartridge system (MCS) in which ajogger, an automatic feeder and a turntable with an operator control panel are shown.

FIG. 1 is a perspective view of one portion of a mail handing system particularly of a mail cartridge system 10 in which an automatic jogger 12 is provided for receiving flat articles 30 such as mail, postcards, envelopes and the like. The jogger 12 receives mail to be sorted and facilitates alignment of the flat article for receipt by an automatic feeder 14. The feeder 14 stacks the mail 30. In the present invention a turntable 16 is provided for pivoting to and from a first adjacent position 16*a* to a second position 16*b*. The stacked articles 30 are unloaded from a mail cartridge 20 present to feeder 14 by turntable 16.

Figure 2:
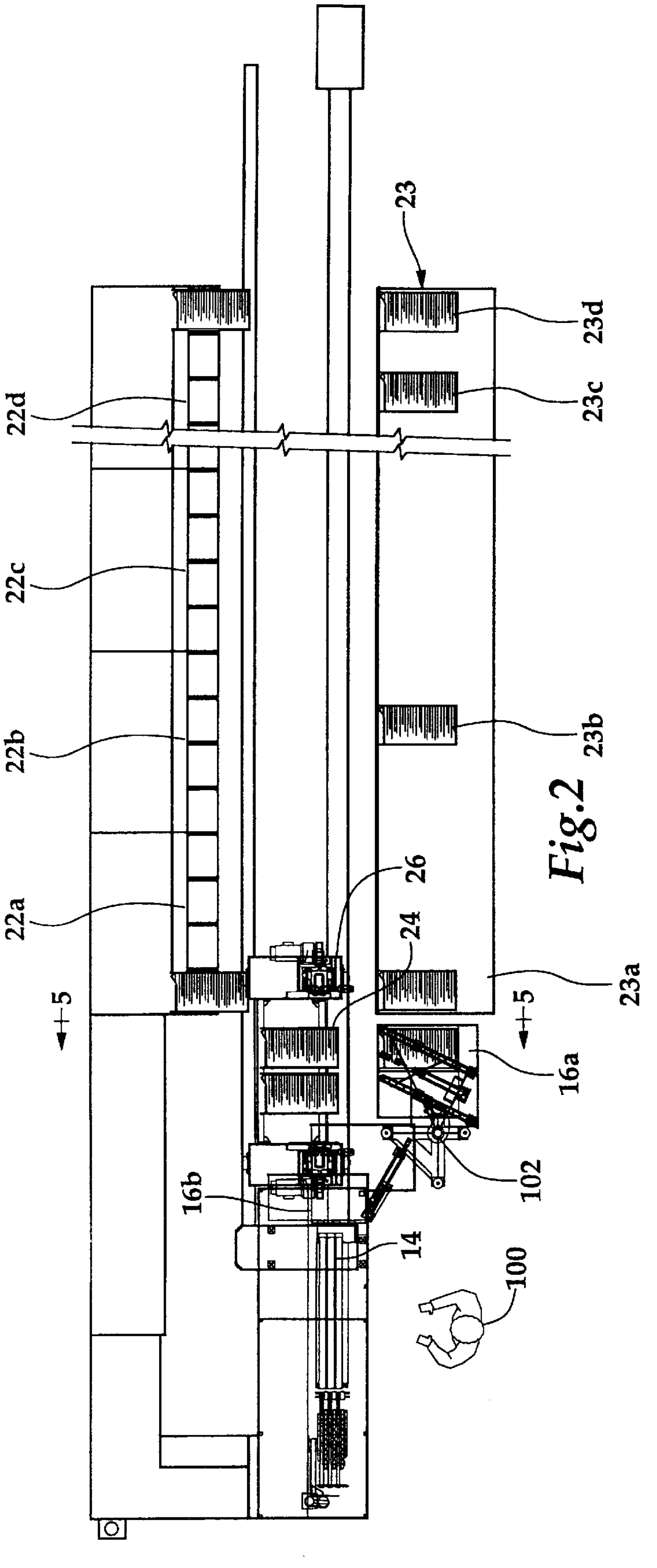
FIG. 2 is a schematic plane view of an automatic feeder, turntable, stacker modules and end-effector of a mail cartridge handling system, according to one embodiment of the present invention.
Figure 3:
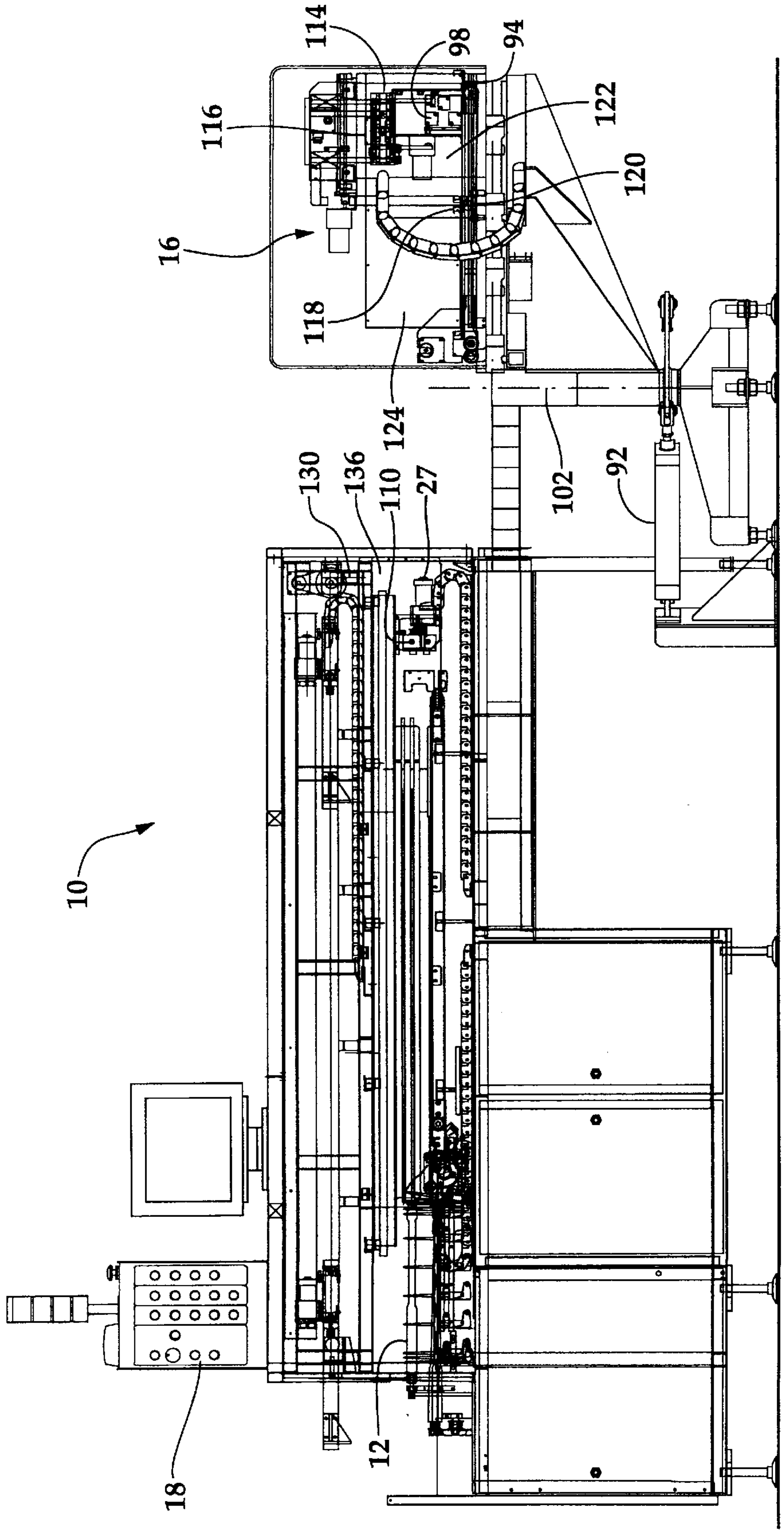
FIG. 3 is a schematic side view of an automatic feeder and turntable.

Additional understanding of the general operation of the mail cartridge delivery system, and particularly the relationship between the automatic feeder 14 and the turntable 16 can be more fully understood with reference to FIGS. 1 and 2 and also FIG. 3 which is a schematic side view of the automatic feeder 14 of FIGS. 1 and 2 and of the turntable 16. A typical automatic jogger 12 is depicted. An automatic feeder paddle 13 and flat article holding fingers 15. Further schematically depicted is a drawbridge mechanism 130 which serves to bridge a gap 136 between the automatic feeder 12 and the cartridges 20 held in the turntable 16 and it will be discussed more fully below.

Figure 14:
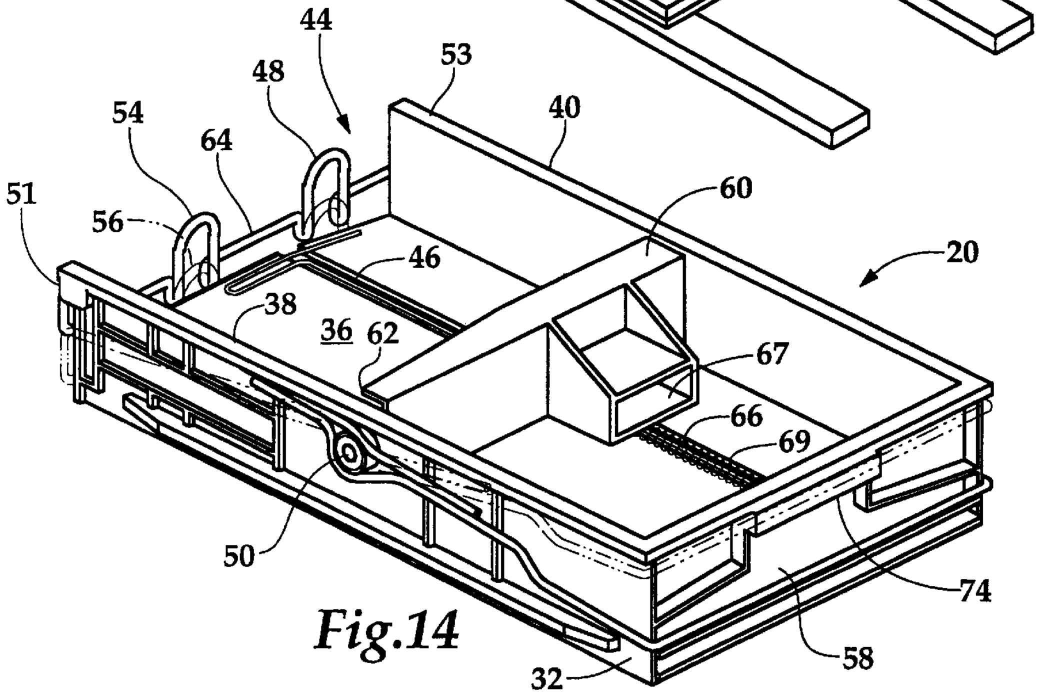
FIG. 14 is a perspective view of a mail cartridge, according to one aspect of the present invention.
Figure 17:
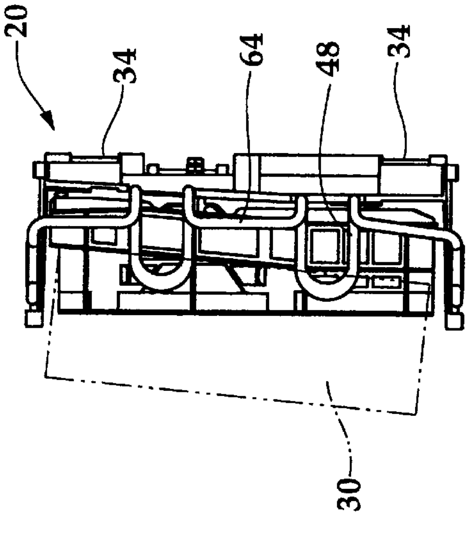
FIG. 17 is a front view of the mail cartridge of FIG. 14.
Figure 18:
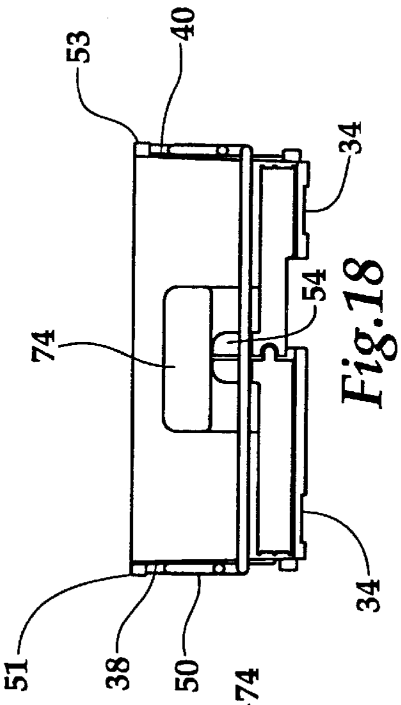
FIG. 18 is a rear view of the mail cartridge of FIG. 14.
Figure 15:
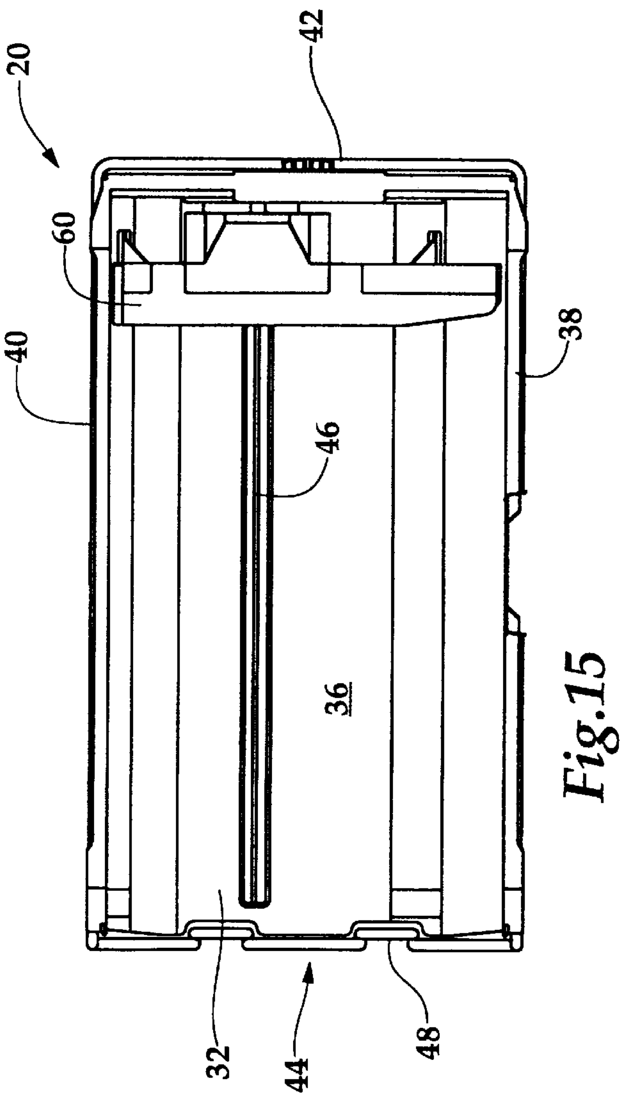
FIG. 15 is a top plan view of the mail cartridge of FIG. 14.
Figure 16:
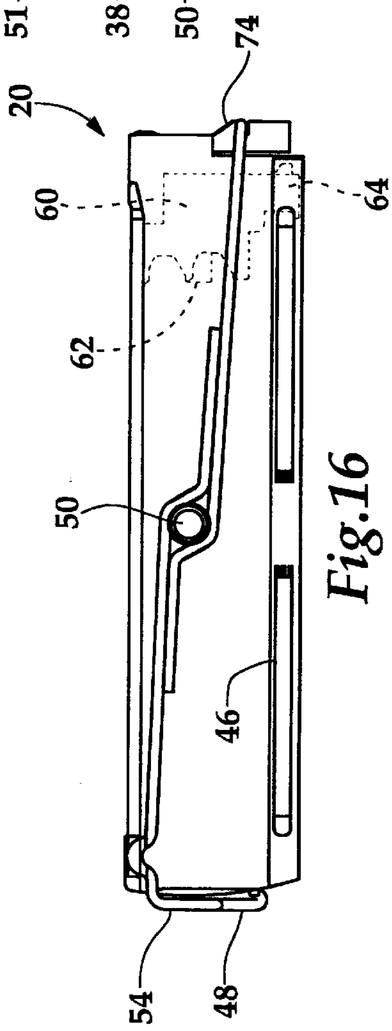
FIG. 16 is a schematic side view of the mail cartridge of FIG. 14.
Figure 19:
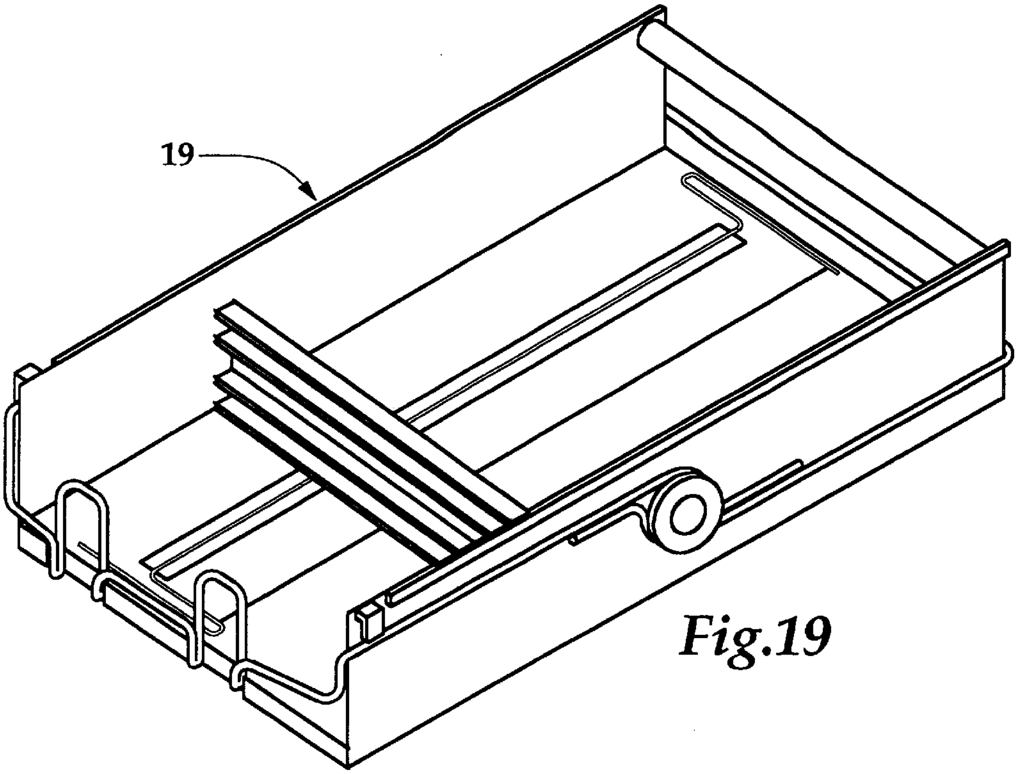
FIG. 19 is a schematic perspective view of an alternative embodiment of a mail cartridge, according to one aspect of the present invention.
Figure 20:
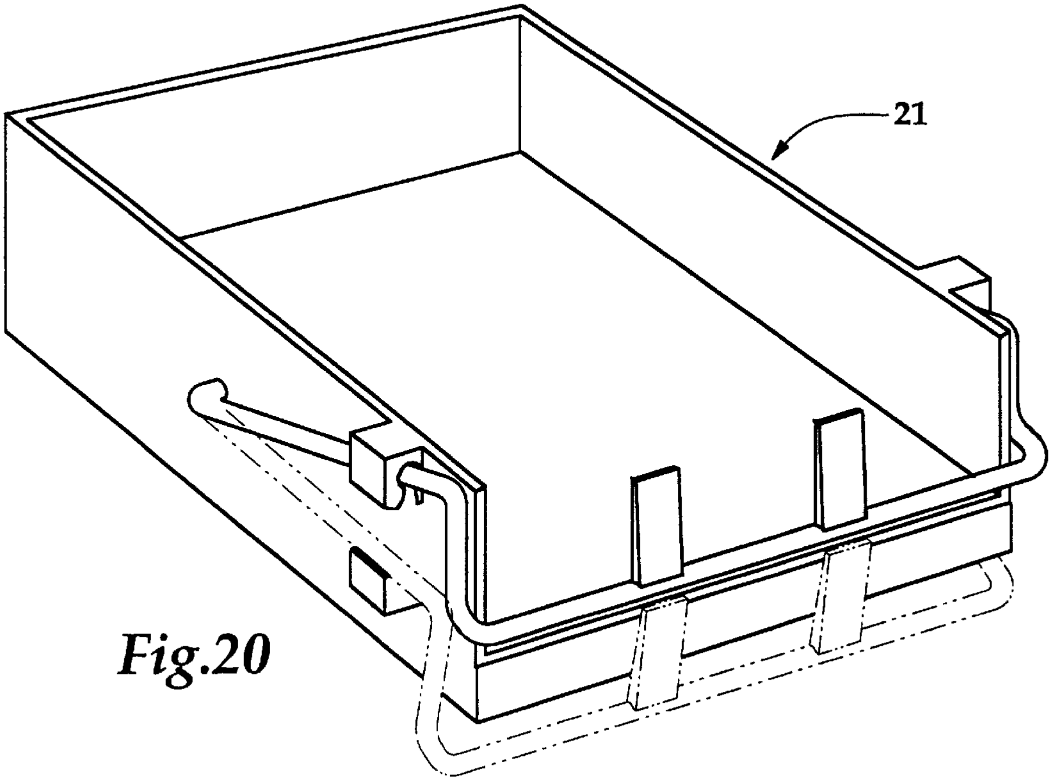
FIG. 20 is a schematic perspective view of another embodiment of a mail cartridge, according to aspect of the present invention.
Figure 21:
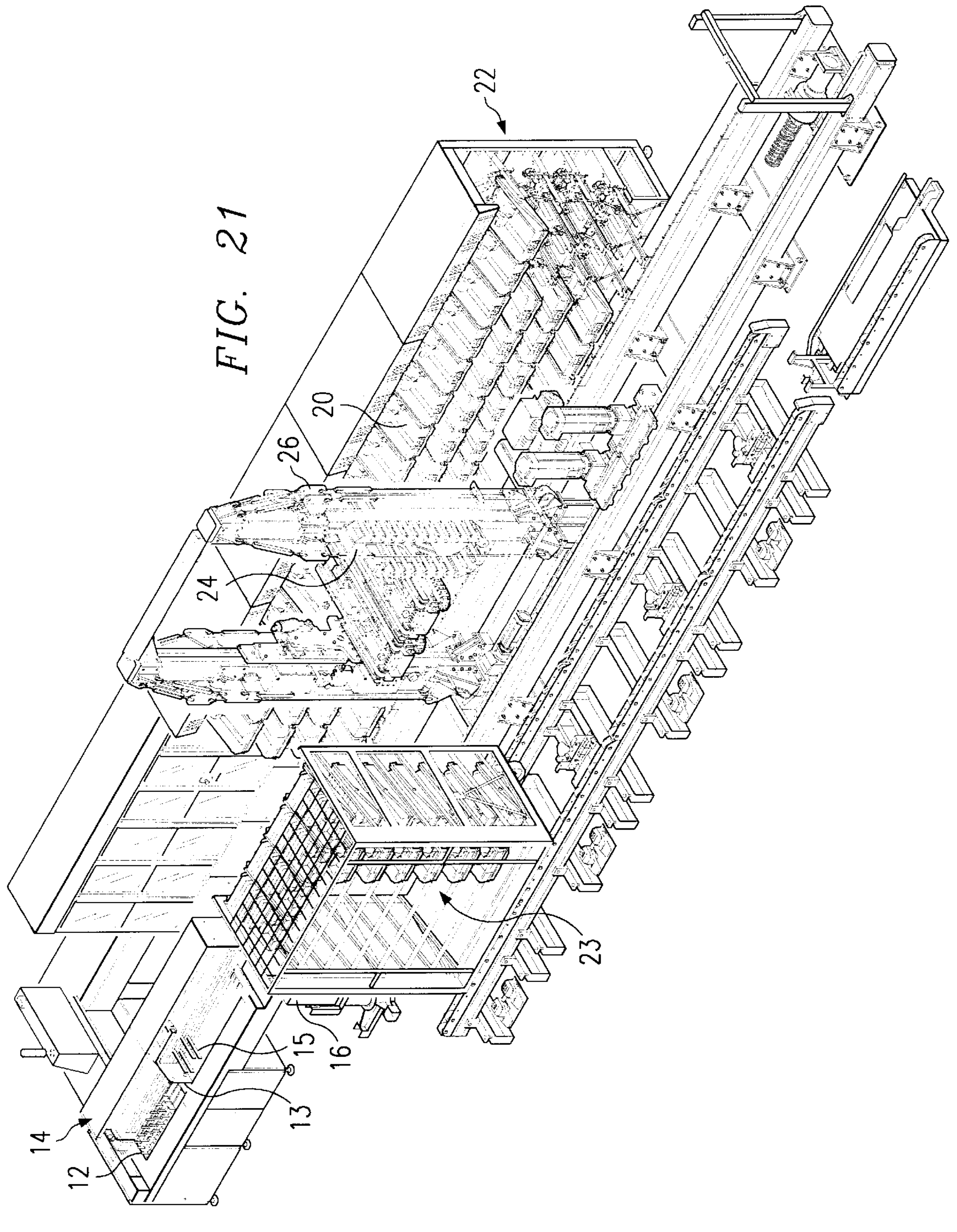
FIG. 21 is an overall perspective view of a mail cartridge system ("MCS") in accordance with another preferred embodiment of the present invention.
Figure 22:
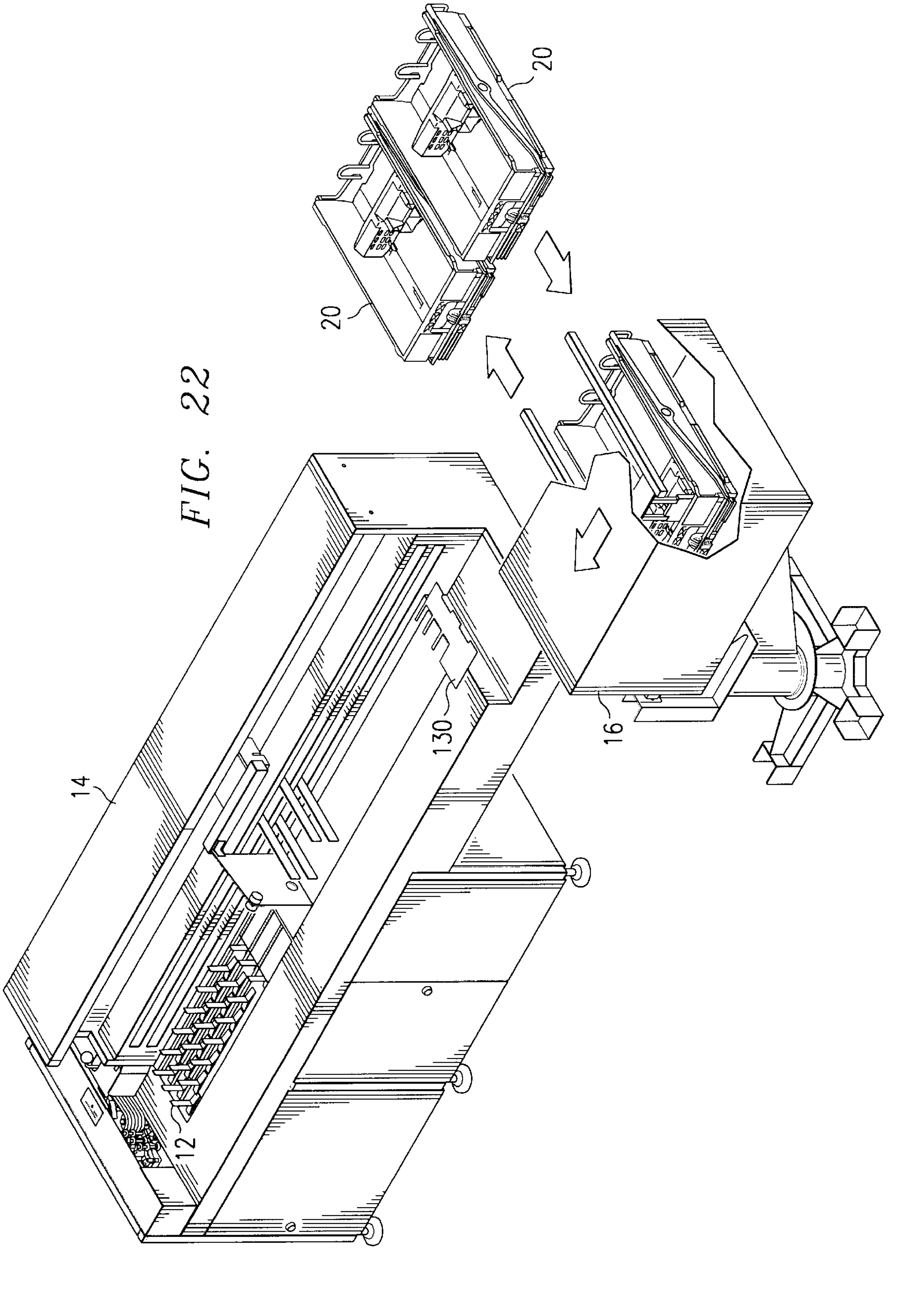
FIG. 22 is a perspective of an automatic feeder and turntable in accordance with the preferred embodiment of FIG. 21.
Figure 23A:
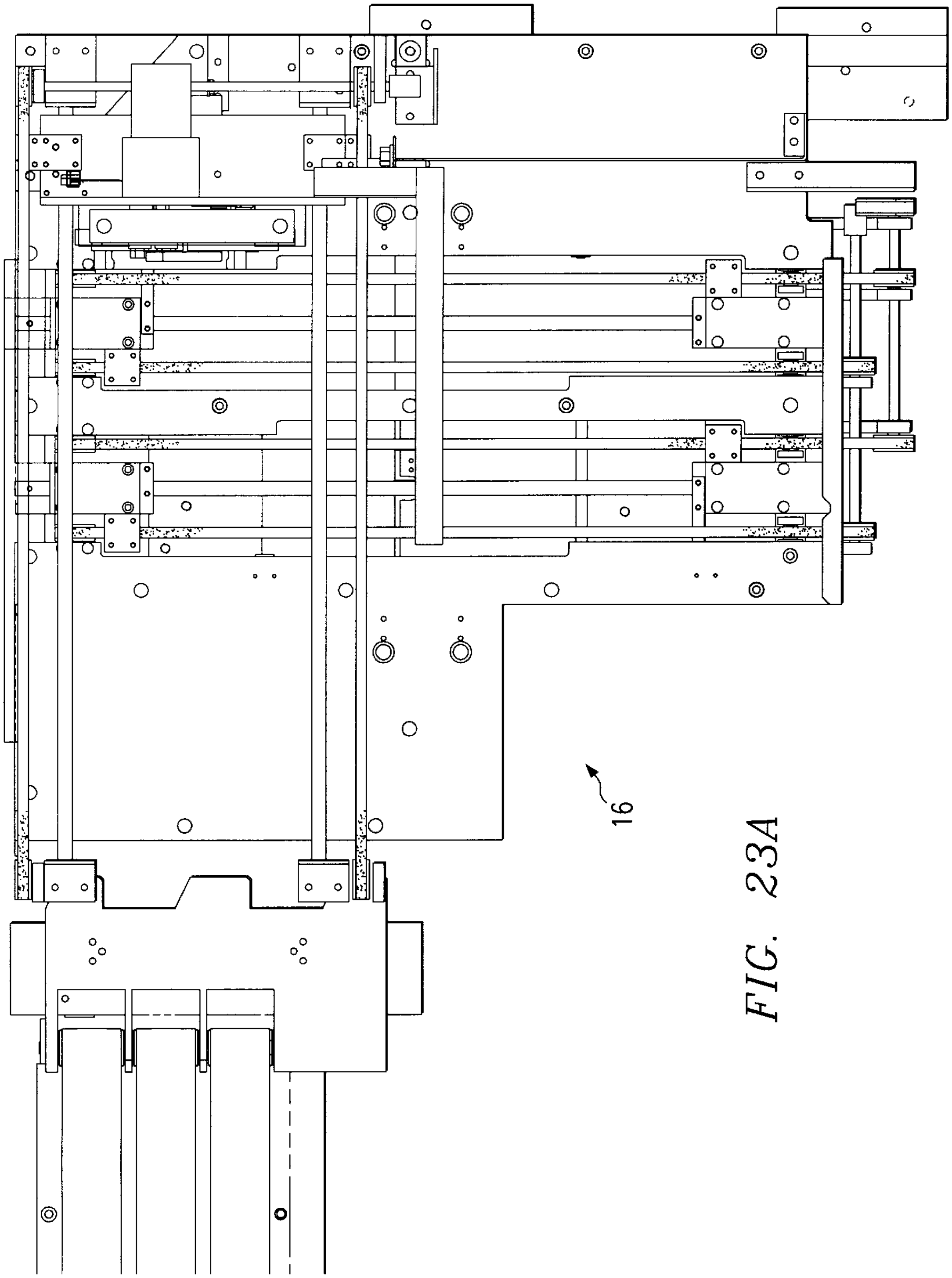
FIG. 23A is a top view of the turntable of FIG. 22 in position to load mail into the automatic feeder turntable in accordance with a preferred embodiment of the present invention.
Figure 23C:
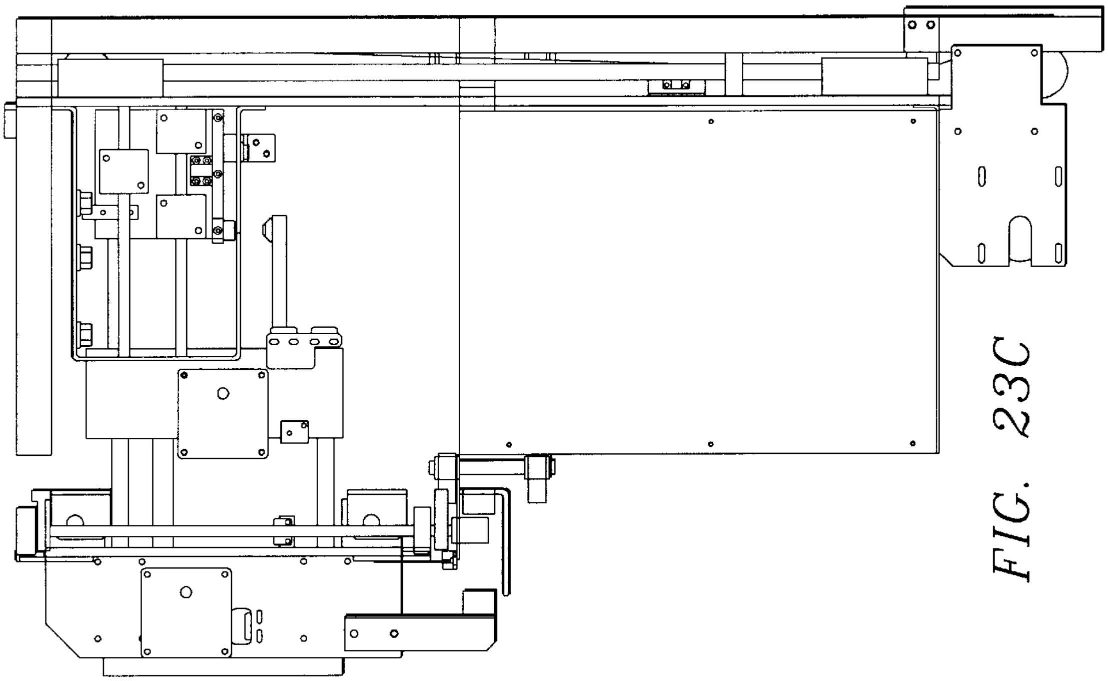
FIG. 23C is an end view of the turntable of FIG. 22 in accordance with a preferred embodiment of the present invention.
Figure 23B:
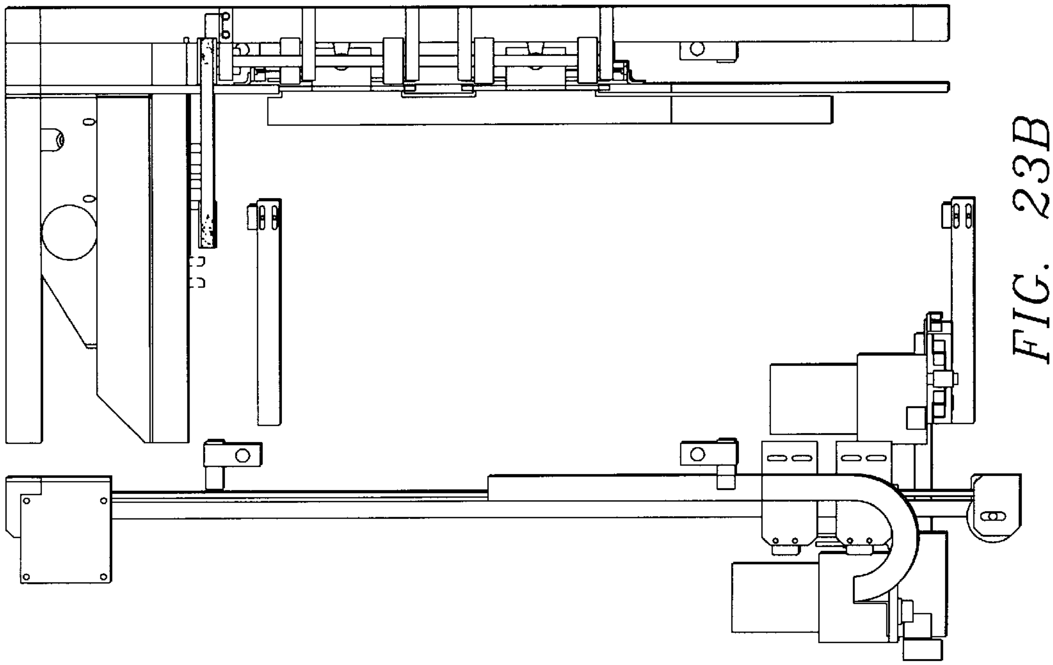
FIG. 23B is a side view of the turntable of FIG. 22 in accordance with a preferred embodiment of the present invention.
Figure 24:
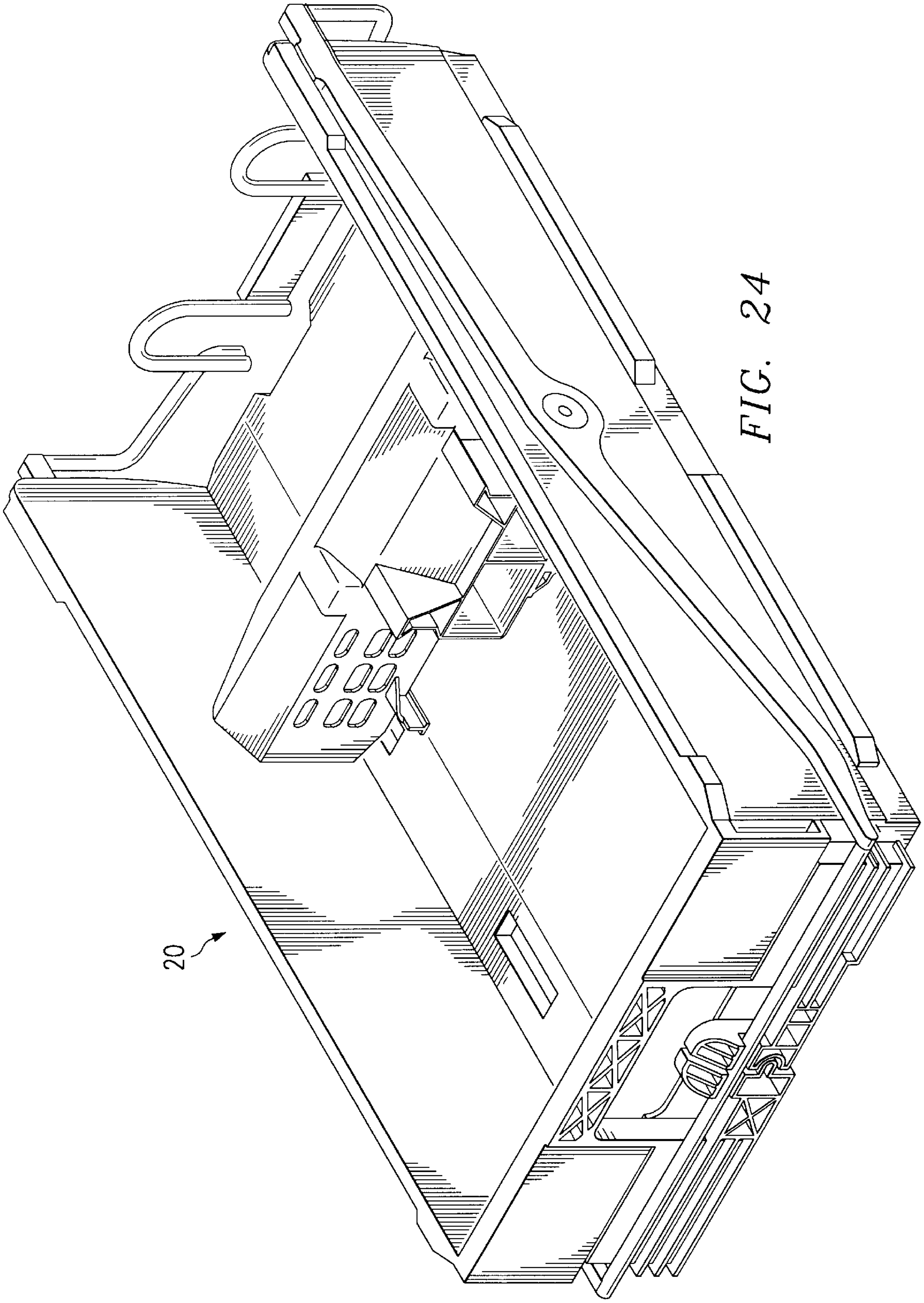
FIG. 24 is a perspective view of a mail cartridge, according to the present invention as shown in FIG. 21.
Figure 25:
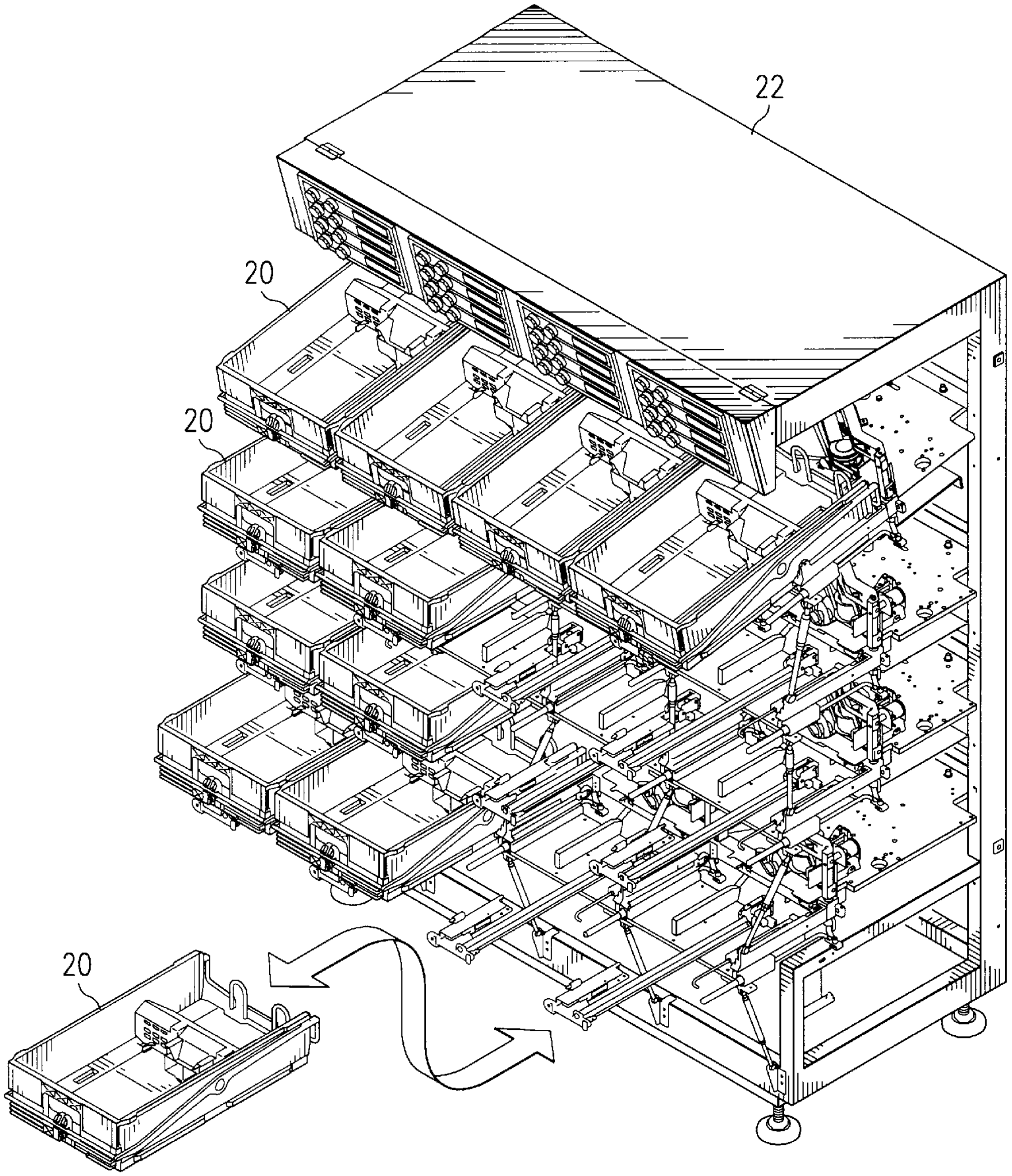
FIG. 25 is a perspective view of a stacker module containing an array of cartridges and stacker interfaces in accordance with a preferred embodiment of the present invention according to the present invention as shown in FIG. 21.
Figure 26:
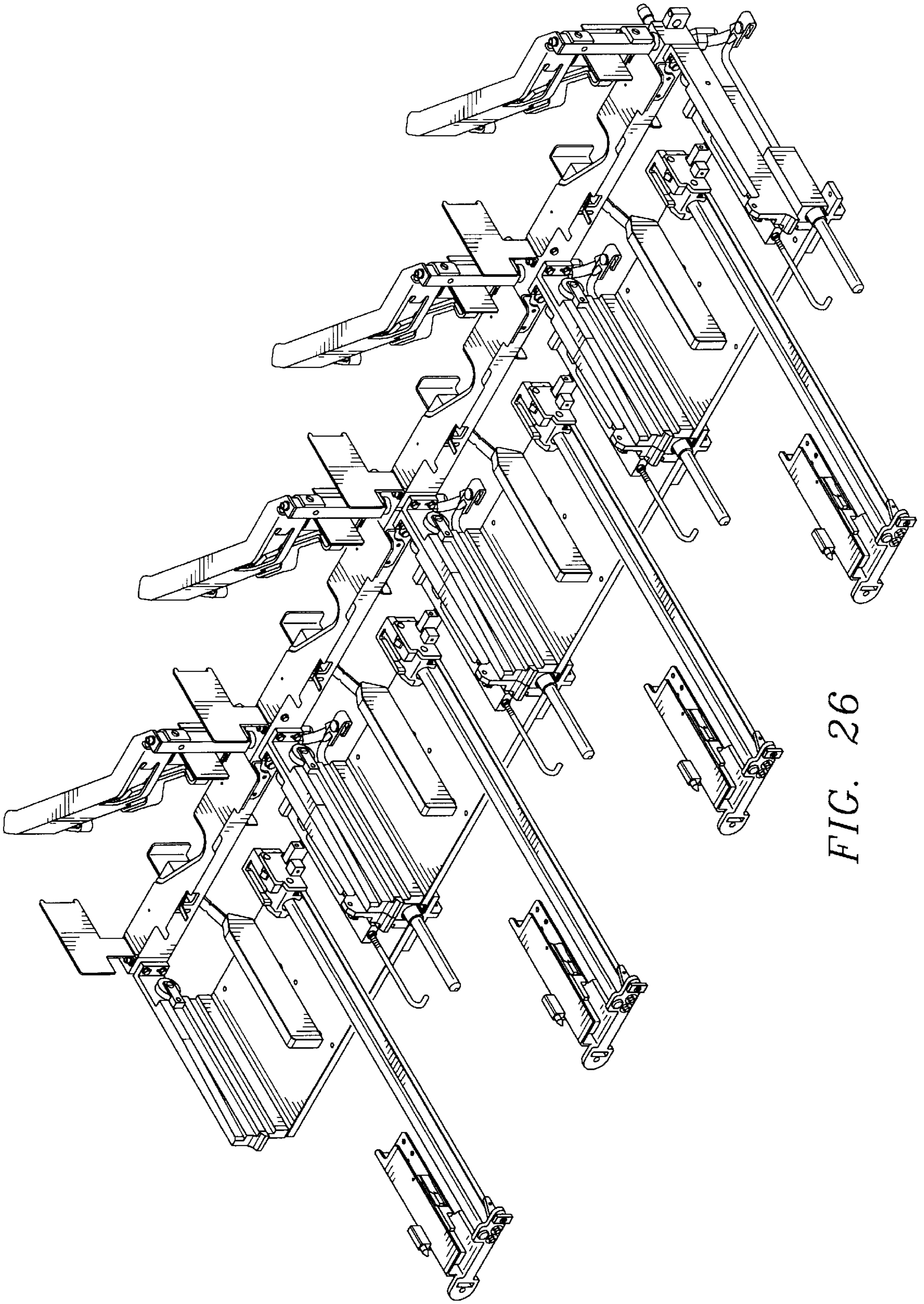
FIG. 26 is a perspective view of a stacker interface subassembly apparatus in accordance with a preferred embodiment of the present invention according to the present invention as shown in FIG. 21.
Figure 27:
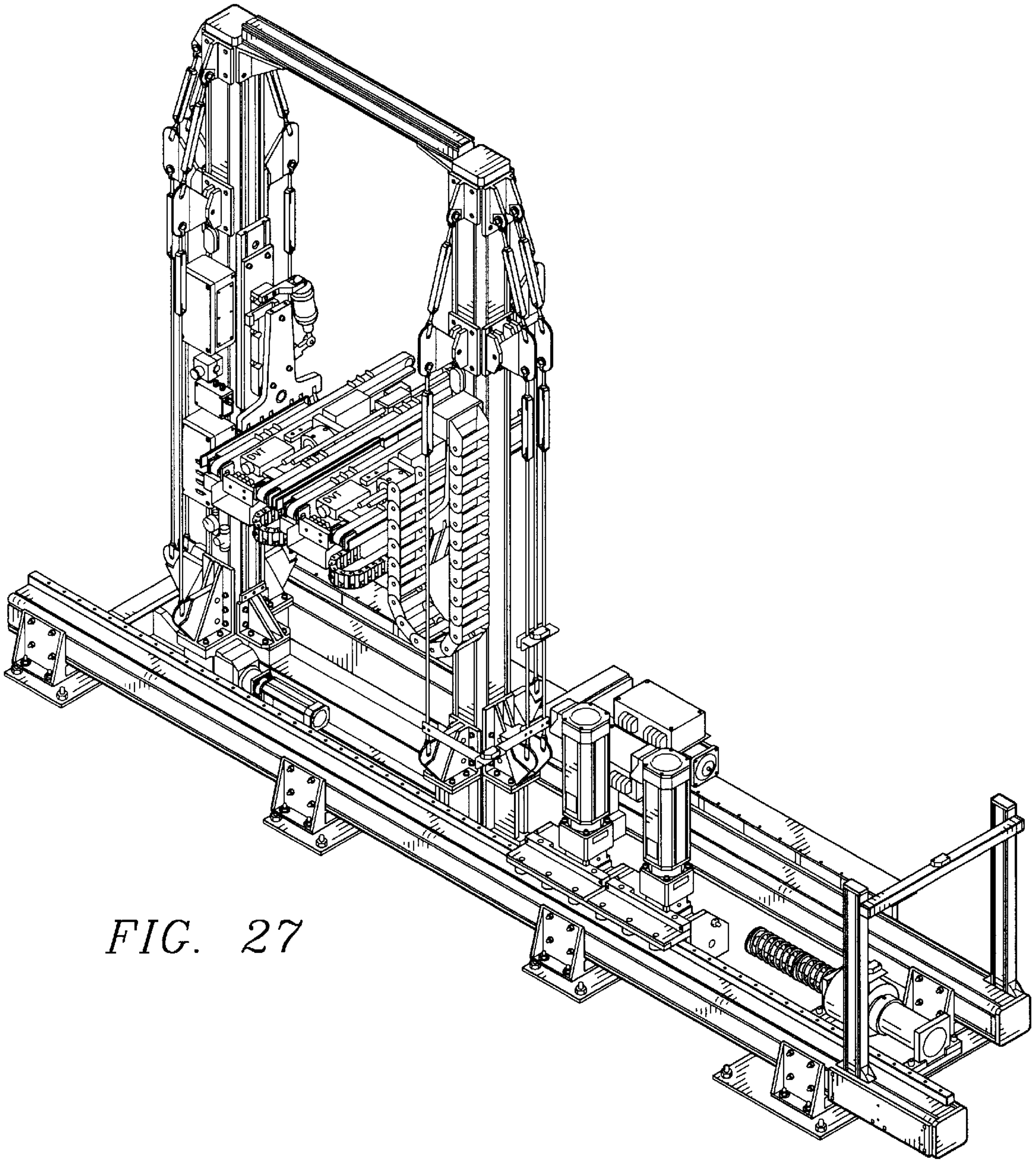
FIG. 27 is a perspective view of a mail cartridge handler (robot) with an end-effector with dual cartridge holding capabilities depicted therein, in accordance with a preferred embodiment of the present invention according as shown in FIG. 21.

So that a better understanding of the cartridge handling system may be had, a description of the flat article cartridge 20 is provided with reference to FIGS. 14, 15 16, 17 and 18. FIG. 14 is a prospective view of one embodiment of the mail cartridge 20 according to one aspect of the present invention. FIG. 15 is a schematic top plan view, FIG. 16 is a side elevation view, FIG. 17 is a front view and FIG. 18 is a schematic rear view of the mail cartridge 20 at FIG. 14. The cartridge body 32 has a bottom 36 side walls 38 and 40 and rear wall 42. A front opening 44 is alternatively opened and closed with a drop gate 48 for receiving sorted or stacked flat articles 30 when the drop gate is open at position 56 and for retaining the articles within the cartridge when drop gate 48 is closed at position 54. Pivot points 50 and 52 are provided for positioning the drop gate in its opened or closed positions 56 and 54. A built-in latch mechanism 58 is provided for holding the drop gate in a closed position 54 corresponding to a transport mode. Receptacles at 51 and 53 are formed in front corners of the cartridge 32 for receiving portions of the drop gate and holding the drop gate relative to side wall 38 and 40 thereby strengthening the corners of the cartridge during transport. The cartridge bodies are constructed for stacking on top of each other when empty. A locking bar 46 is provided along the bottom 36 of the cartridge body for removable attachment of the flat article stack support 60 which is preferably engaged with the locking bar 46 through an insert 66. Stack support panel 60 is provided with front rib 62 to engage flat articles 30 as they are loaded into the cartridge.

The cartridge body 32 is preferably constructed with durable plastic material having friction criteria for allowing flat articles to conveniently slide there along. Particularly reduced friction for paper articles such as mail, and envelope sliding is preferred. The material construction has also preferably has a proper static electricity conductivity so that the static electricity does not build up and interfere with proper mail sliding and handling. The plastic material further desirably has strength, durability, low friction and static electricity conductivity in adverse and extreme ambient temperature and humidity conditions. Opening may be provided to allow miscellaneous debris to fall through the cartridge and avoid accumulation therein. The built-in handle such as handle 74 at the rear wall and handle 64 provided by the drop gate 48 at the front opening allow manual manipulation and also mechanical transport of the cartridge by the cartridge.

The drop gate 48 is in the embodiment depicted in FIGS. 14, 15, 16 and 17 is constructed of a steel wire engaging the side walls at pivot points 50 and 52 and further engaging corners 51 and 53 and latch mechanism 54 to add strength to the plastic cartridge body 32 during stacking and transport. The steel wire drop gate 48 is able to be manipulated from the rear end of the cartridge or from the front opening of the cartridge so that it is convenient to both equipment operators 100 or to robotically contained end-effector 24.

This steel wire drop gate 48 acts as a "door" for the front opening 44 of the cartridge 20. In a closed position 56, the gate 48 retains the stacked articles and blocks all normal paths that the flat articles may come out of the flat cartridge body 32. The steel wire drop gate pivots about predetermined locations 50 and 52 to a lowered position 56 when the cartridge is in position adjacent to the sorting machine so that the drop gate 48 stays out of the high speed flat article or mail movement path from the sorting machine into the cartridge. The wire at drop gate 48 is bent in a configuration to form a handle 64 near the center of the front opening 44 for ease of handling by equipment operator when necessary. The bent wire configuration of the drop gate acts as a locking bar which may move over cam lugs in a stacker interface mechanism 28 thereby holding the cartridge in position in the stacker interface. The wire drop gate 48 also acts as an actuator for a limit switch at the auto feeder 12 to indicate the cartridge is in position for receiving stacked mail or alternatively a limit switch 29 and the interface to indicate that the cartridge is properly positioned in the secured position in the stacker module 22. The cartridge body also has a set of tracks 34 molded into and underneath the body 32 to engage with an extraction mechanism 94 of the turntable, a conveyor 88 of the stacker interface or a conveyor 144 of the end-effector 24 held in the robotic cartridge handler 26.

The steel wire drop gate is of a shape which is easily locked into an "up" or closed position 54 by a latch mechanism 58 formed at the rear of the cartridge body 32.

According to another aspect of the invention, a mail stack supporter panel 60 sometimes referred to as a supporter paddle assembly is provided for movement of the stack inside the cartridge body. The mail stack support panel 60 is designed with front rib 62 to pre-bias the flat articles 30 while the cartridge 20 is being filled. The stack support panel assembly 60 is able to move smoothly between the front and rear of the cartridge through all specified ranges of sorted flat article sizes. Preferably, the stacks support panel 60 and the rib 62 are made of a tough plastic and a steel insert 66 is provided with a shape and a pattern to match the exterior shape of the locking bar 46. The steel insert 66 engages with the locking bar 46 no matter how much mail or how many stacked articles are in the cartridge. A small spring 69 is positioned between the steel insert 66 and the locking bar 46 to aid engagement there between. There is a built-in access area 67 to fit human hands for manual disengagement of the locking bar 46 if required. Simple release of the stack support panel 60 will automatically re-engage in a new desired position. Features are also provided to enable the end-effector robot 24 to automatically position the stack support 60 in a pre-determined forward location during cartridge insertion. The stack support panel 60 is also constructed to mate with a mechanism on an interface between the automatic mail sorter 10 and the cartridge 20. This construction allows the stack support 60 to move smoothly, by way of attachment 68 mounted on linear recirculating ball bushing lighting on a smooth surface of the locking bar 46. The stack support panel 60 applies a light force, under about 2 pounds, on the stack of flat articles by way of a constant force spring 70 attached to the interface mechanism that the stack support mates to. Temporary joining of the stack support 60 to a sliding attachment 68 also activates external switches 72 indicating that the cartridge is full of stacked articles 30 and that the stack of articles is ready for extraction. When the cartridge is removed from the interface, the stack support 60 automatically disengages from the sliding attachment 68.

Figure 10:
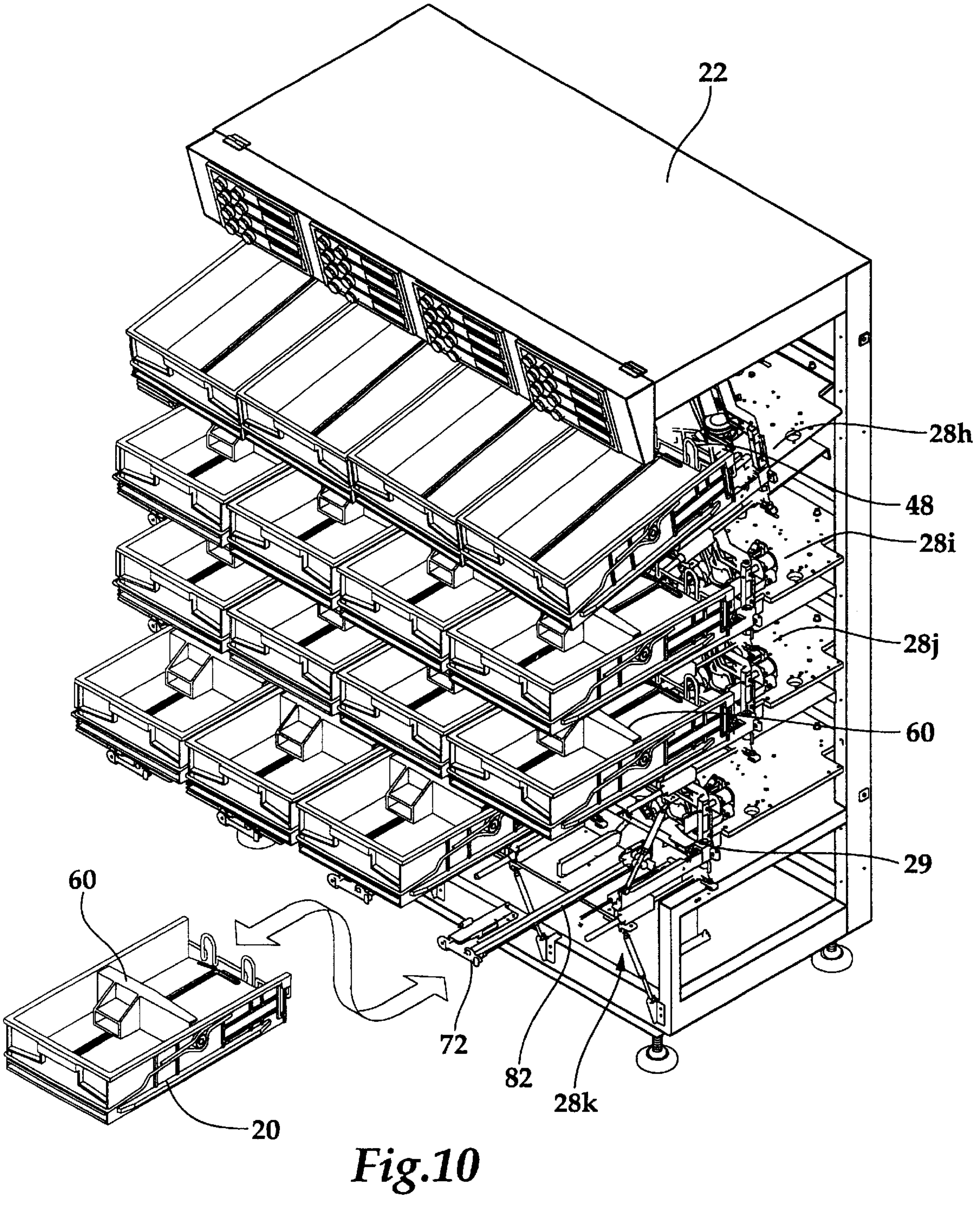
FIG. 10 is a schematic perspective view of cartridges and a stacker interface of a mail handling system, according to one aspect of the present invention.
Figure 11:
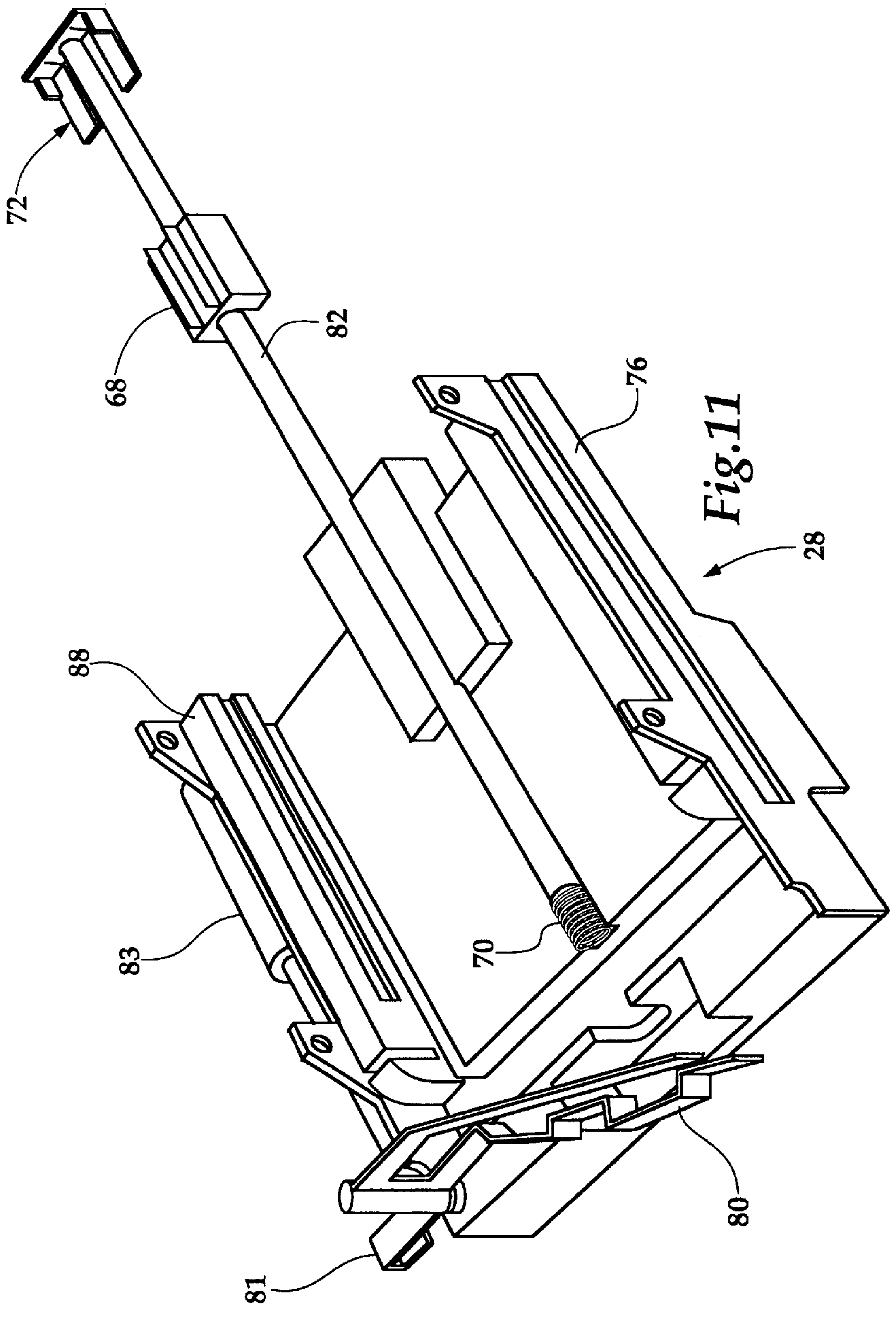
FIG. 11 is a schematic perspective view of a stacker interface subassembly apparatus, according to one aspect of the present invention.
Figure 12:
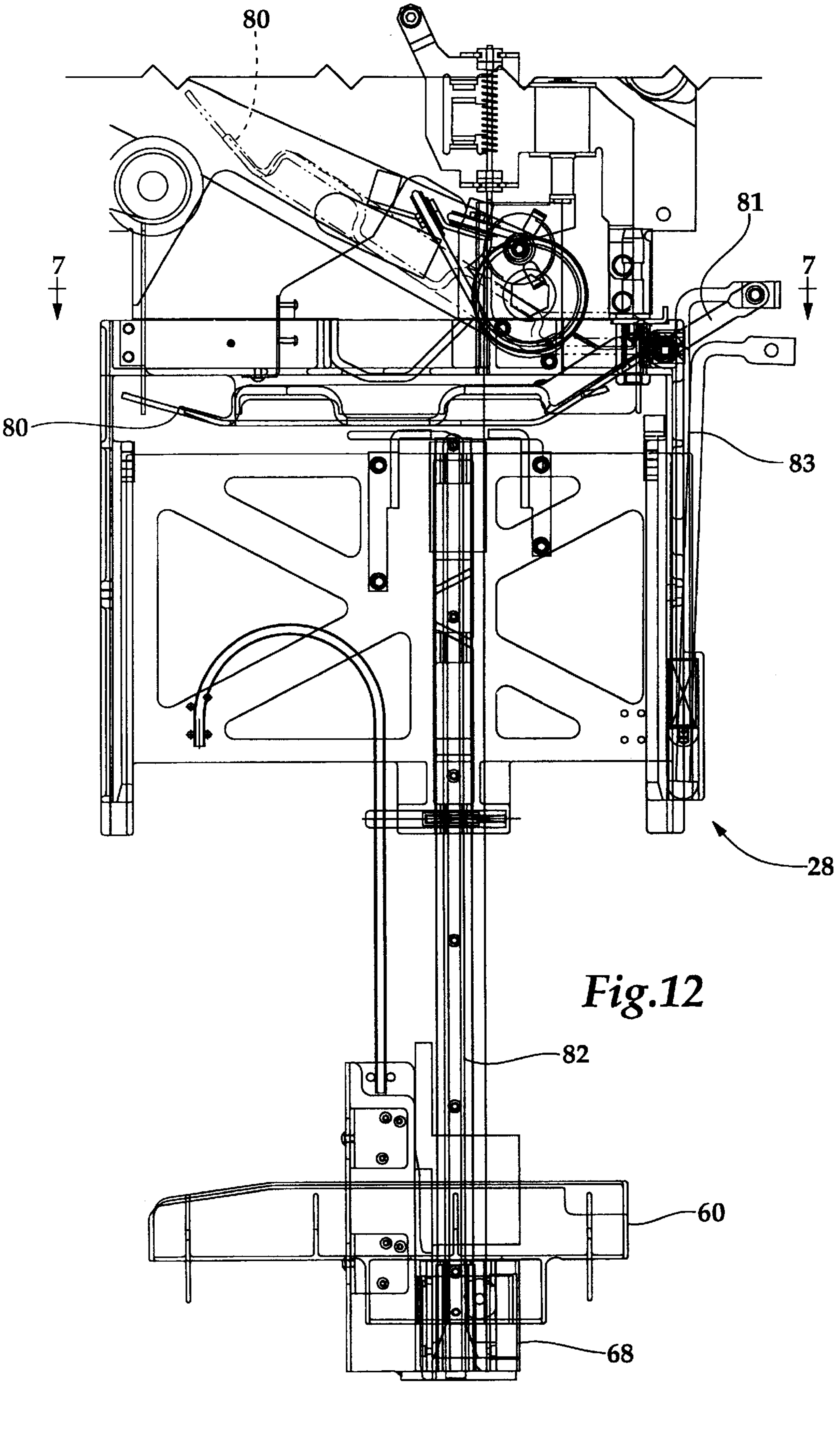
FIG. 12 is a schematic top plan view with hidden lines showing certain features of the stacker interface of FIG. 11.
Figure 13:
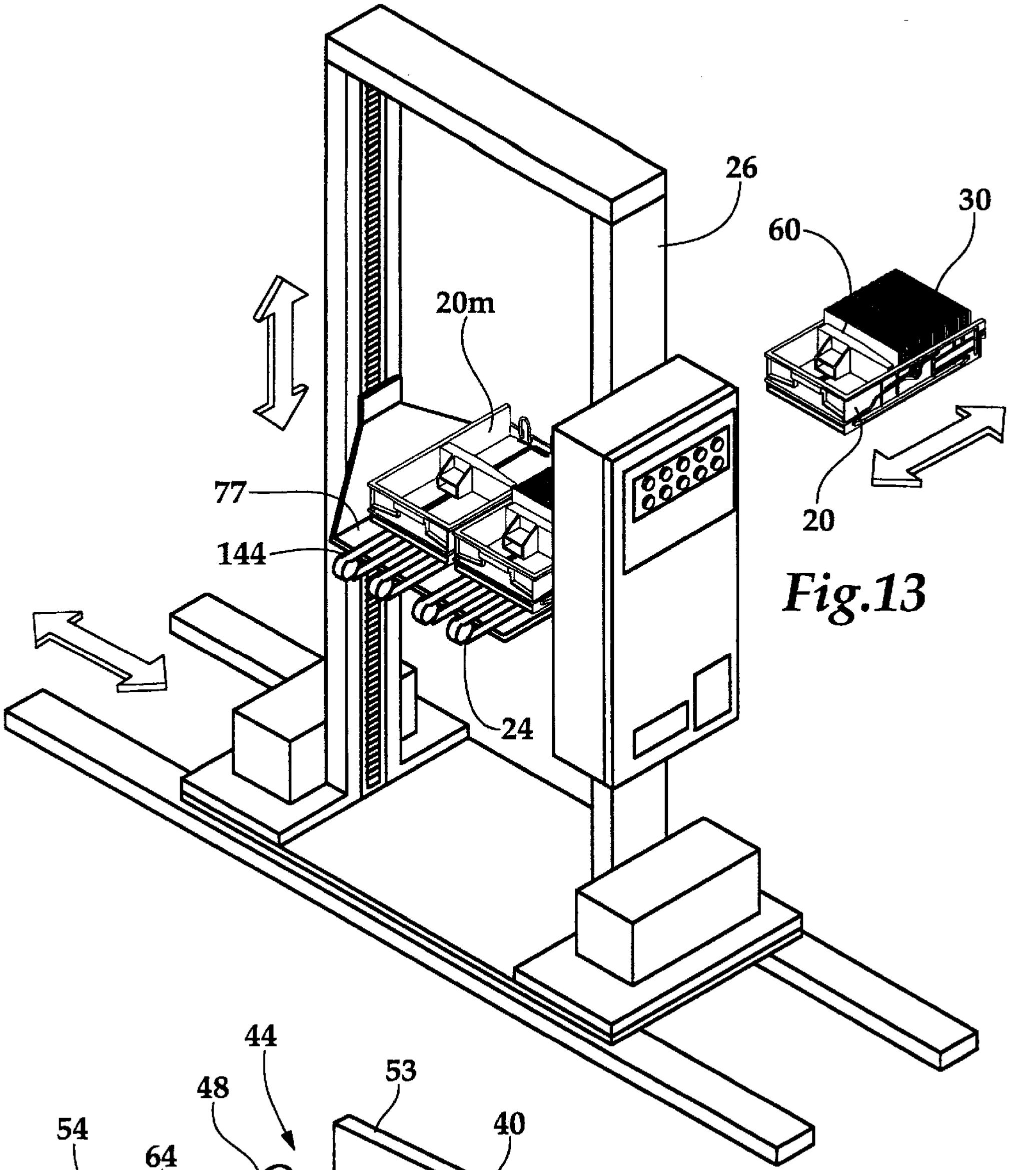
FIG. 13 is a perspective view of a mail cartridge handler (robot) with an end-effector with dual cartridge holding capabilities depicted therein, according to one aspect of the present invention.

This construction can be more fully understood with reference to FIG. 11 and 12 in which FIG. 11 is a perspective view of a stacker interface and FIG. 12 is a schematic top plan view of a stacker interface with the cartridge stack support panel 60 schematically depicted partially engaged with the interface as described. Thus according to another aspect of the present invention, the stacker interface 28 is added to stacker modules 22(*a–d*) as further depicted in FIG. 10. Which is a perspective view of a stacker module 22 depicting the plurality of mail cartridges 20, and particularly at positions 22(*h, i, j* and *k*) having stacker interfaces at corresponding locations at 28(*h, i, j* and *k*). The stacker interface as shown in FIG. 11 includes a cradle 76 for a flat article cartridge 20 constructed to allow the cartridge to be property seated to receive mail from a sorter 10. Limit switch is mounted at 78 are provided which detect whether the cartridge is present and also detects the fill level of the cartridge. A sweep gate 80 is provided that guides mail into the cartridge. The sweep gate 80 has linkage partially depicted at 81 in FIG. 11 and at 81 and 83 in FIG. 12 arranged to allow the mail cartridge handling machine 26 (shown in FIGS. 1, 2 and 5) to activate the sweep function and to remove the stacked articles from the cartridge. Also advantageously, the stacker interface 28 houses a linear bearing rod 82 and an attached shuttle 84 that act together to guide the stack support panel 60 in the cartridge 20 when the cartridge 20 and interface 28 are mated. A latch mechanism 86 is also provided that allows the linear bearing rod 82 to be extended and subsequently manually retracted so that maintenance can be performed on the stacker interface 28. The bearing rod 82 can then be reinserted and latched into place for proper functioning.

Referring again to FIGS. 1, 2 and 4, additional details of the turntable 16 may be more fully understood. Turntable 16 is provided as an extension of the automatic feeder 10 and interfaces with a mail cartridge handler and interfaces between the automatic feeder 10 and a mail cartridge handler or a robotic cartridge handler that carries an end-effector. The turntable in the first position 16*a* presents an empty cartridge 20 to the mail cartridge handler 26 and simultaneously accepts a cartridge 20 that is full of flat stacked articles 30 or that is full of mail. The turntable 16 is then rotated 90° about a vertical axis 102 using an air cylinder 92 to reach position 16*b*. The full cartridge is indexed to an active side of the turntable, and upon rotation of 90°, mates with the automatic feeder at position 16*b*. Thus the full cartridge is rotated and indexed to a line with the automatic feeder mechanism 14. An extraction mechanism 94 is provided on the turntable, including a wire gate opening mechanism 96 for opening the wire drop gate 48 on the cartridge 20. A stacked article bundle pusher 98 is also provided on the turntable for pushing the mail bundle 30 out of the full cartridge 20. The bundle pusher 98 pushes on the back of the stack support panel 60. A pause mechanism 110 causes the turntable and the stacked article bundle pusher to wait for the finger 15 on the automatic feeder 14 to take away the bundle of articles 30 pushed from the cartridge 20. A gate closer mechanism 114 is also provided on the turntable and operative connected for closing the wire drop gate 48 on the cartridge 20. The closer mechanism 114 is appropriately located on the turntable 16 for engagement with the wire drop gate 14 of the cartridge bundle and may be part of the same mechanism as gate opener 96 operated in a reverse direction to perform the gate closing function to provide a preferred embodiment. An index mechanism 118 is provided to index the extraction mechanism 94 back to face the mail cartridge handler 26. A mechanism 120 is provided for indexing the empty cartridge from an active side 122 to a passive side 124 of turntable 16.

Figure 4:
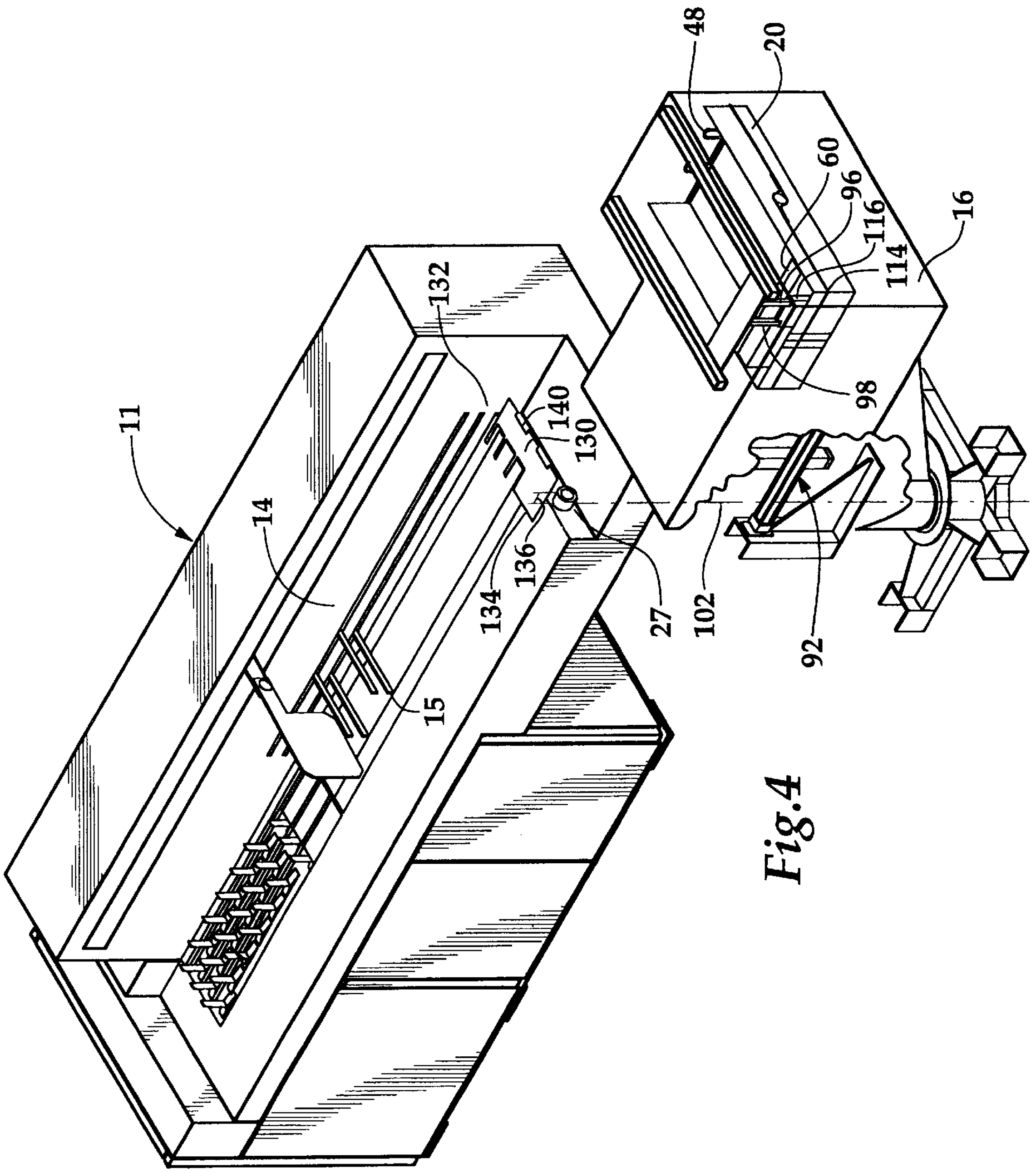
FIG. 4 is schematic perspective view of another mail cartridge handler system, according to another embodiment of the present invention.

A drawbridge mechanism 130 as shown in FIG. 4 is provided toward one end 132 of an automatic feeder mechanism 14. The drawbridge mechanism 130 is in the form of a plate 134. The plate 134 closes a small gap 136 between a cartridge 20 held in the turntable 16 and the automatic feeder 14. The cartridge 20 has a wire gate 48 and is moved to an open position 56 when positioned adjacent to the automatic feeder 14. The drawbridge effectively closes the small opening 136 which might otherwise result between the cartridge and the open wire gate. Plate 134 of the drawbridge is advantageously provided with notches 140 correspondingly located to the upward projections of wire gate 48. This advantageously allows the cartridge to be moved as closely as possible to the automatic feeder 14 without leaving any open space 136 therebetween. The drawbridge therefore prevents the mail from falling in the small gap 136 and from otherwise getting stuck during the transfer between the mail cartridge and the feeder. This improvement to the automatic feeder 14 facilitates the use of the inventive turntable 16, according to the present invention. The drawbridge operates synchronously with the wire gate opener 96 and wire gate closer 114 on the turntable.

Figure 5:
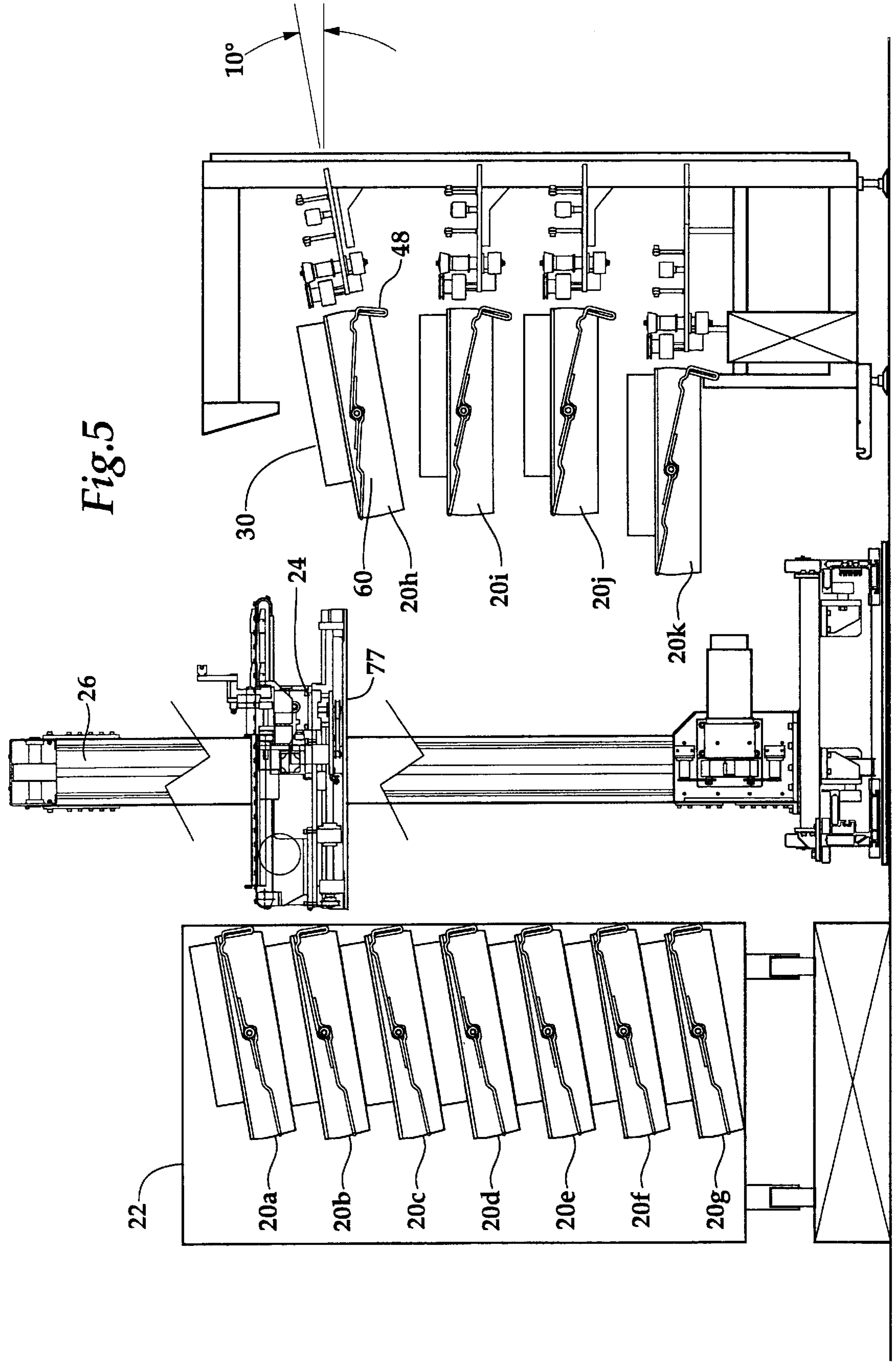
FIG. 5 is a schematic section view taken along section line 5—5 of FIG. 2.
Figure 6:
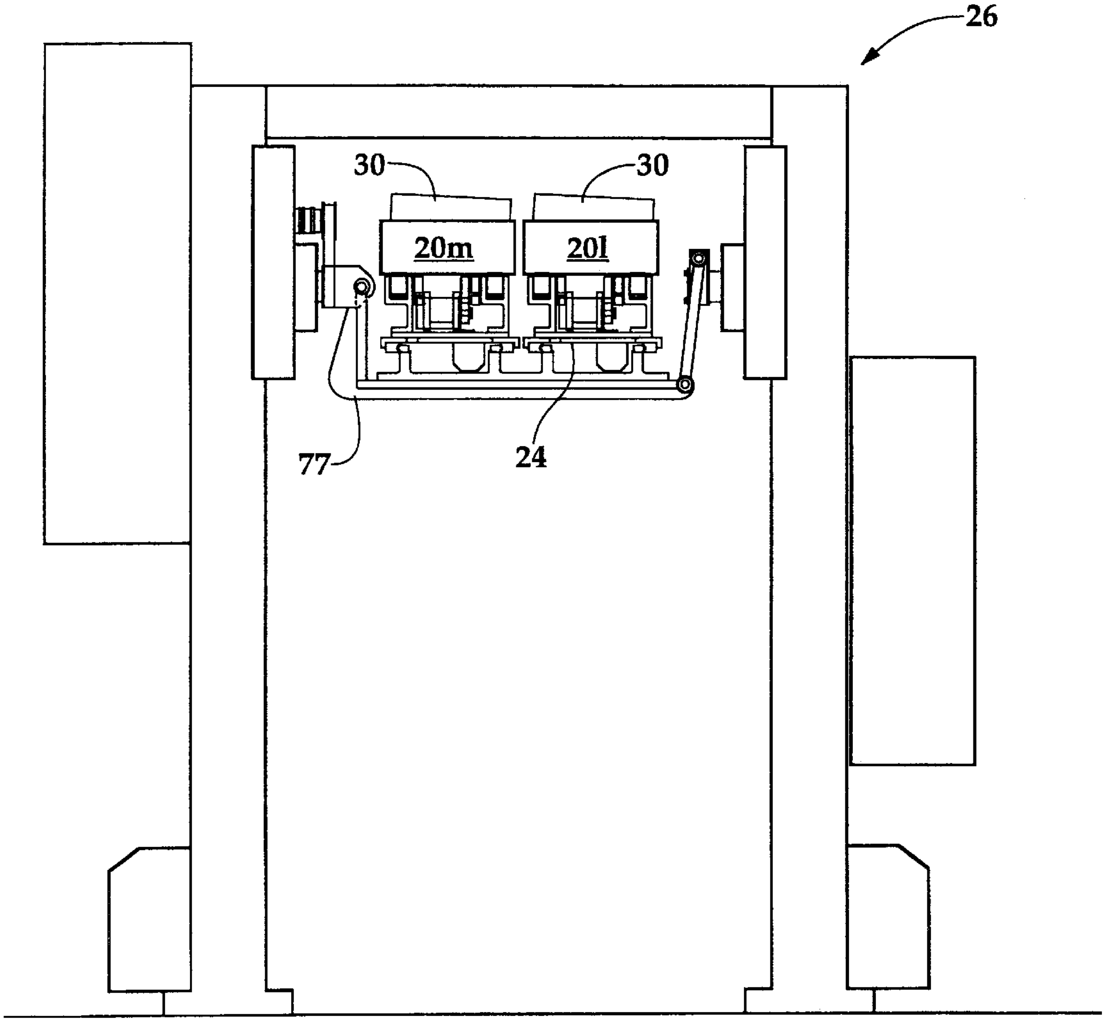
FIG. 6 is a schematic front view of an end-effector and the mail cartridge handler system, according to one aspect of the present invention.
Figure 7:
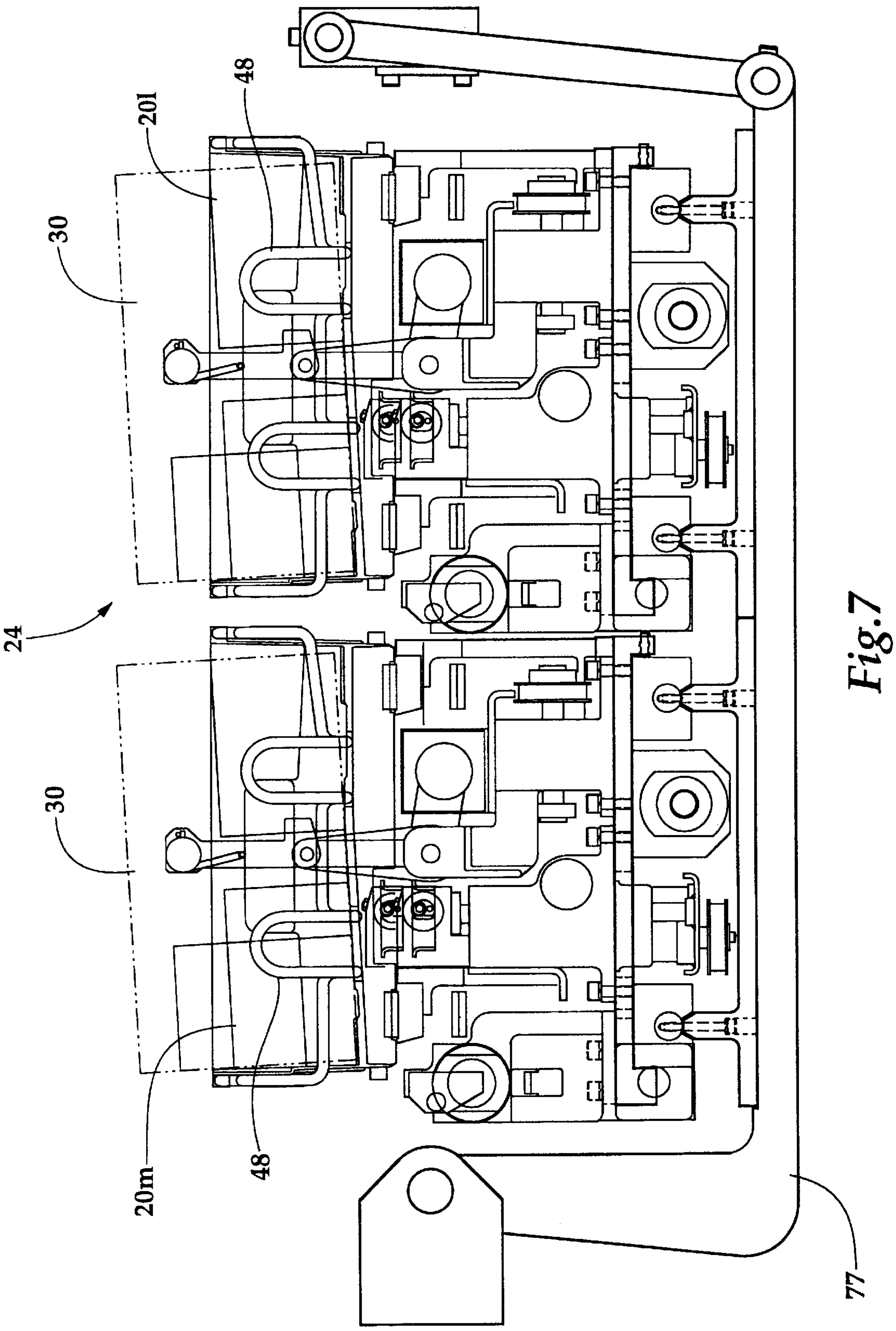
FIG. 7 is a schematic enlarged front view of the end-effector of FIG. 6.
Figure 8:
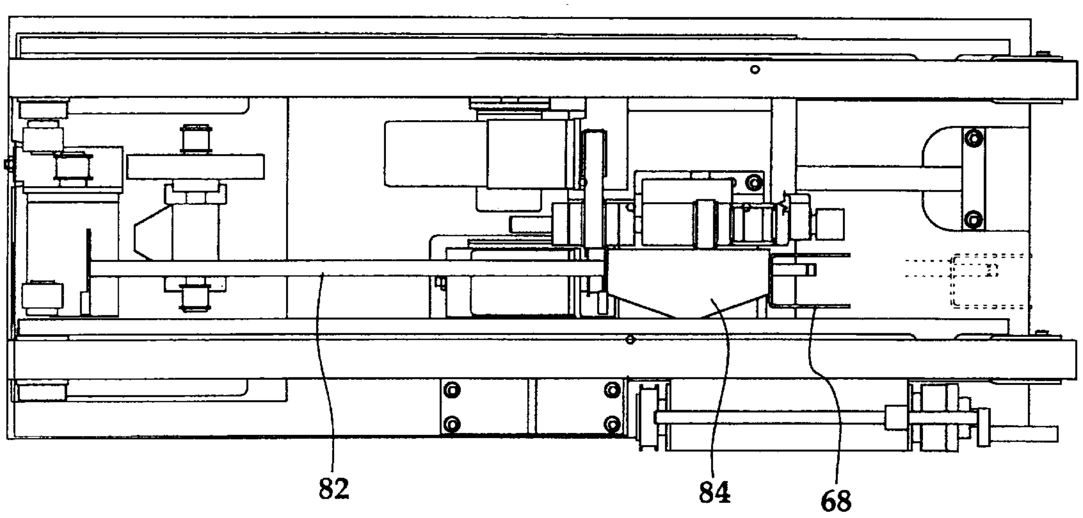
FIG. 8 is a schematic top plan view of the end-effector of FIG. 6.
Figure 9:
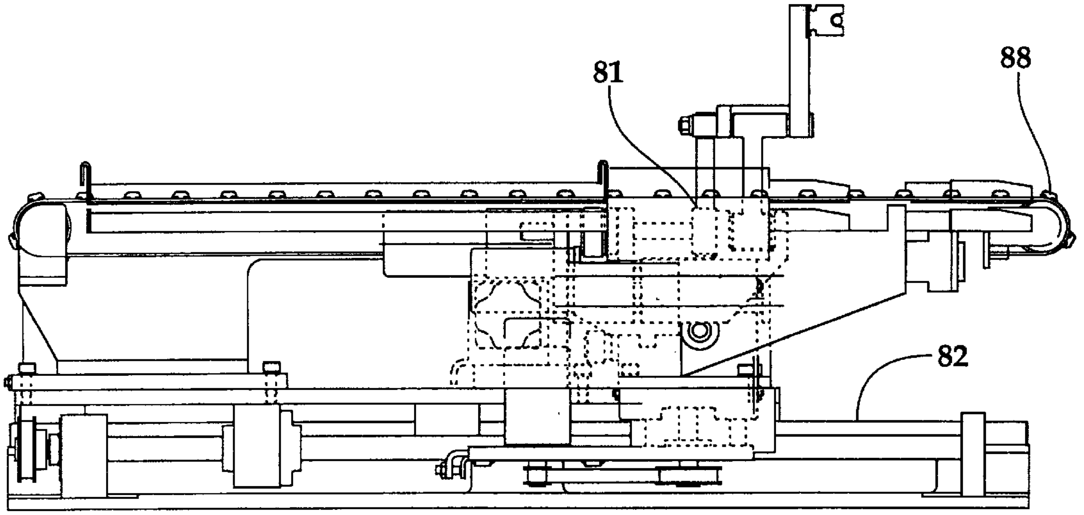
FIG. 9 is a schematic side view of the end-effector of FIG. 6.

Referring now to FIGS. 5, 6, 7, 8, 9 and 13, advantageous features of a mail cartridge handler or a robot for handling stacked articles may be more fully understood. FIG. 5 is a section view taken along section line 55 of FIG. 2 and depicts the end-effector 24 schematically depicted held by cradle 77 supported by handler 26. Thus, the mail cartridge handler 26 positions the end-effector 24 in vertical and horizontal (X-Y) directions for alignment with automatic sorting machine positions, storage buffer carts and storage stacking modules so that the cartridges may interact with the stacker interface devices which cooperate with the end-effector to move the cartridges horizontally from one location to another. The end-effector functions to pull or insert a cartridge, using conveyors 144, to or from the turntable 16, from an automatic feeder machine 14, from storage or sorting modules, from buffer carts, or from conveyor system or the like. The end-effector 24 activates a sweep gate 80, called a "clearing gate" on a stacker interface which fully moves a stack of flat articles or a mail bundle into a cartridge. The end-effector opens and closes the cartridge drop gate 48 and it forces the cartridge stack support panel 60 to mate with the linear bearing rod in the stacker interface. The end-effector also has the capability of tilting and indexing the cartridges as necessary to align the cartridges that may be sitting flat or at a particular incline, preferably up to about 10° incline. The mounting of the end-effector to the mail cartridge handler 24 using the cradle 77 allows the mail cartridge handler to tilt the end-effector up to approximately 30° about the Z axis, (i.e. the axis perpendicular to the mail cartridge handlers X-Y plane of mobility). This tilting action keeps the stacked articles at a side edge during acceleration and avoids dislodging the stacked articles during fast starts and stops or jerks.

FIGS. 21–27 depict an improved design according to the invention wherein the robot and end effector are capable of more rapid and accurate movement. The functioning of the system shown is substantially the same as described in connection with FIGS. 1–20.

Figure 28A:
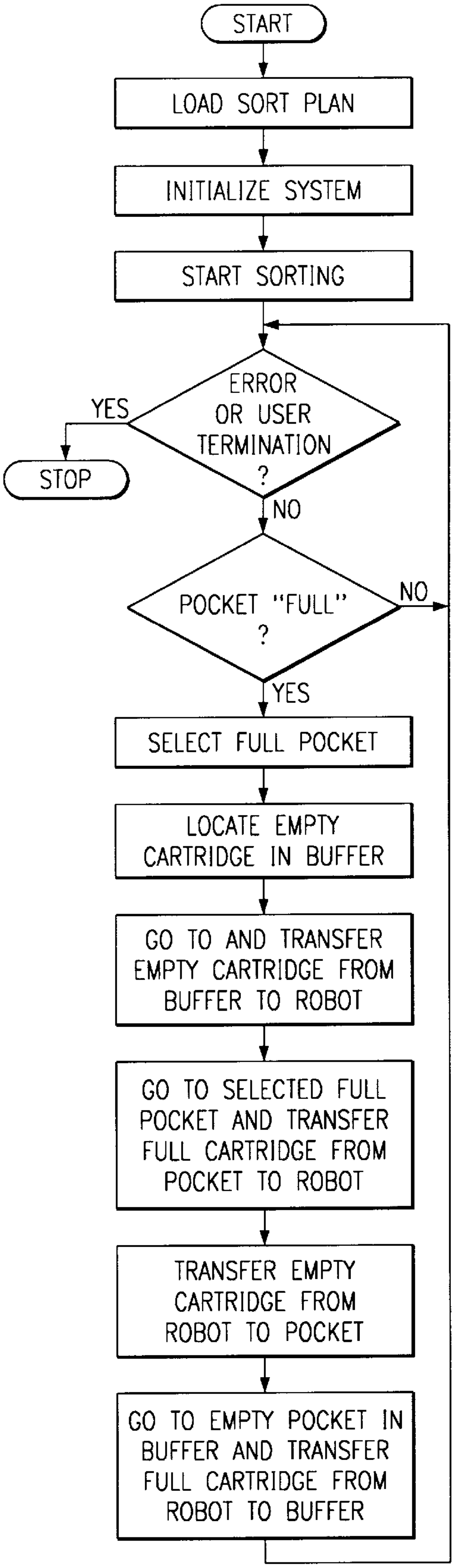
FIG. 28A is a flow chart describing the pass one sorting process in accordance with a preferred embodiment of the present invention.

FIG. 28A is a flow chart describing the pass one sorting process in accordance with a preferred embodiment of the present invention. Processing begins in block 800. Thereafter, the present invention loads the sort plan in block 802 and initializes the system in block 804. The sort plan is provided by whoever wants to sort the flat articles, such as the United States Postal Service. The sort plan correlates zip codes to postal station, route and carrier so that the mail can be directed to the proper cartridge. The system begins sorting in block 806. If the user terminates the sort or an error occurs, as determined in decision block 808, pass one processing stops in block 810. Additionally, the present system has many safety features to prevent injury to personnel. Accordingly, the safety systems will interrupt normal processing at anytime during the described processing steps.

If an error has not occurred or the user has not terminated the process, as determined in decision block 808, the system determines whether a pocket has reached safe capacity in decision block 812. Safe capacity depends on the processing rate of the system, but can easily mean the pocket has reached 98% capacity, which is considered to be full. This minimizes the likelihood that mail would arrive for the pocket while the pocket is being sweep, which would result in the mail being redirected to the overflow pocket. If a pocket is not full, processing loops back to decision block 808 to check for an error or user termination. This loop continues until either an error or user termination is received, as determined in decision block 808, or a pocket is full, as determined in decision block 812. If more than one pocket is determined to be full, a sweep begins in block 814 wherein the full pocket is selected according to a priority list. If only one pocket is full, that pocket will be swept. If, however, more than one pocket is full, a priority list will determine the next pocket to be swept. The priority list may sweep the overflow and rejected pockets first, pockets that are completely full next, and pockets that are 98% full after that.

Next an empty cartridge is located in the buffer in step 816. Typically, the system will locate an empty cartridge in the buffer as close to being opposite from the pocket to be swept as possible. The robot is then directed to go to the location of the empty cartridge and transfer the cartridge from the buffer to the robot in block 818. Next, the robot goes to the selected full pocket and transfers the full cartridge from the full pocket to the robot in block 820. The robot then transfers the empty cartridge from the robot to the pocket in block 822. Next, the robot goes the empty pocket in the buffer and transfers the full cartridge from the robot to the buffer in block 824. This completes the sweep cycle and processing returns to decision block 808 where the previously described process repeats as previously described.

Figure 28B:
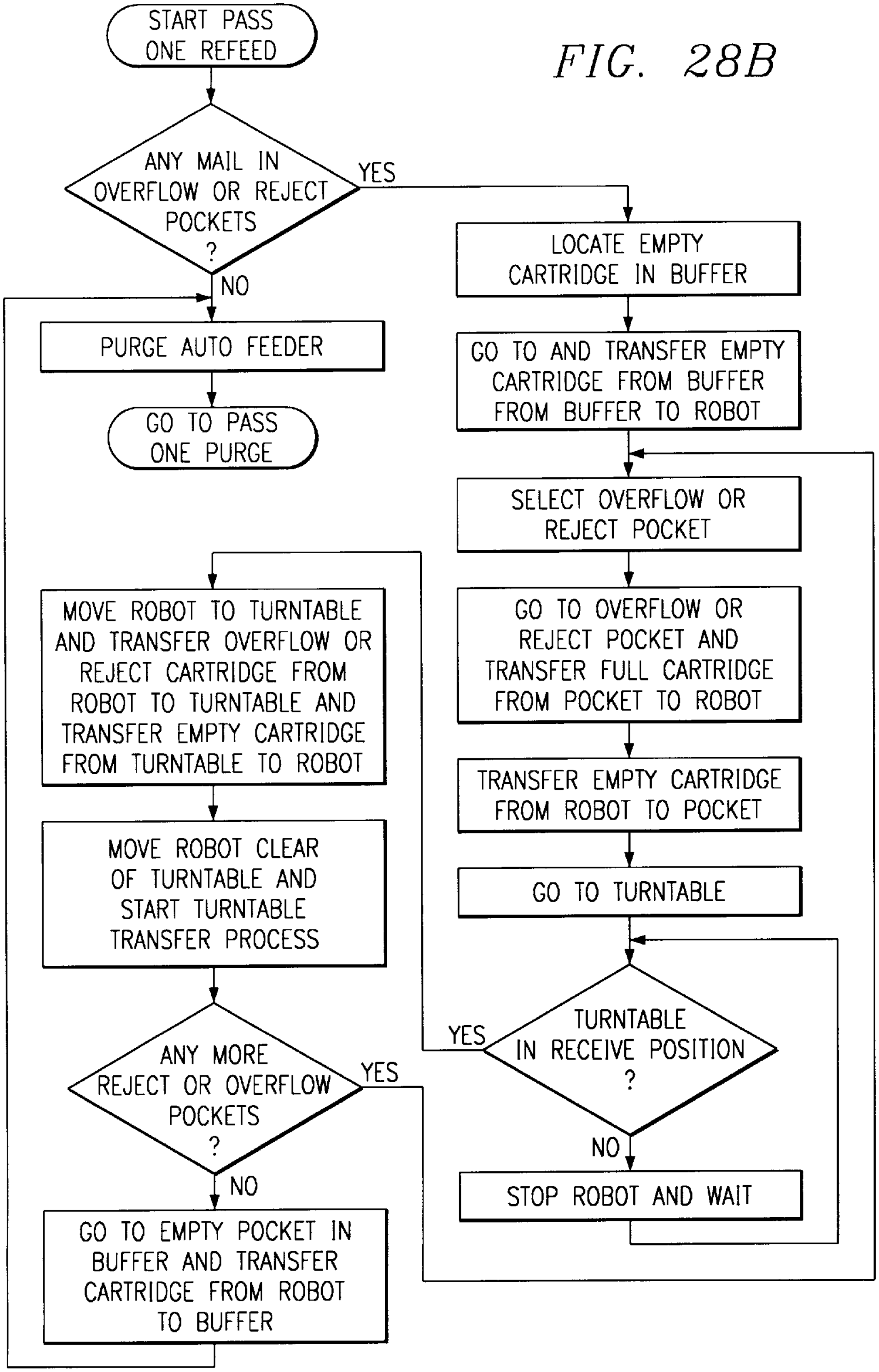
FIG. 28B is a flow chart describing the pass one re-feed process in accordance with a preferred embodiment of the present invention.
Figure 28C:
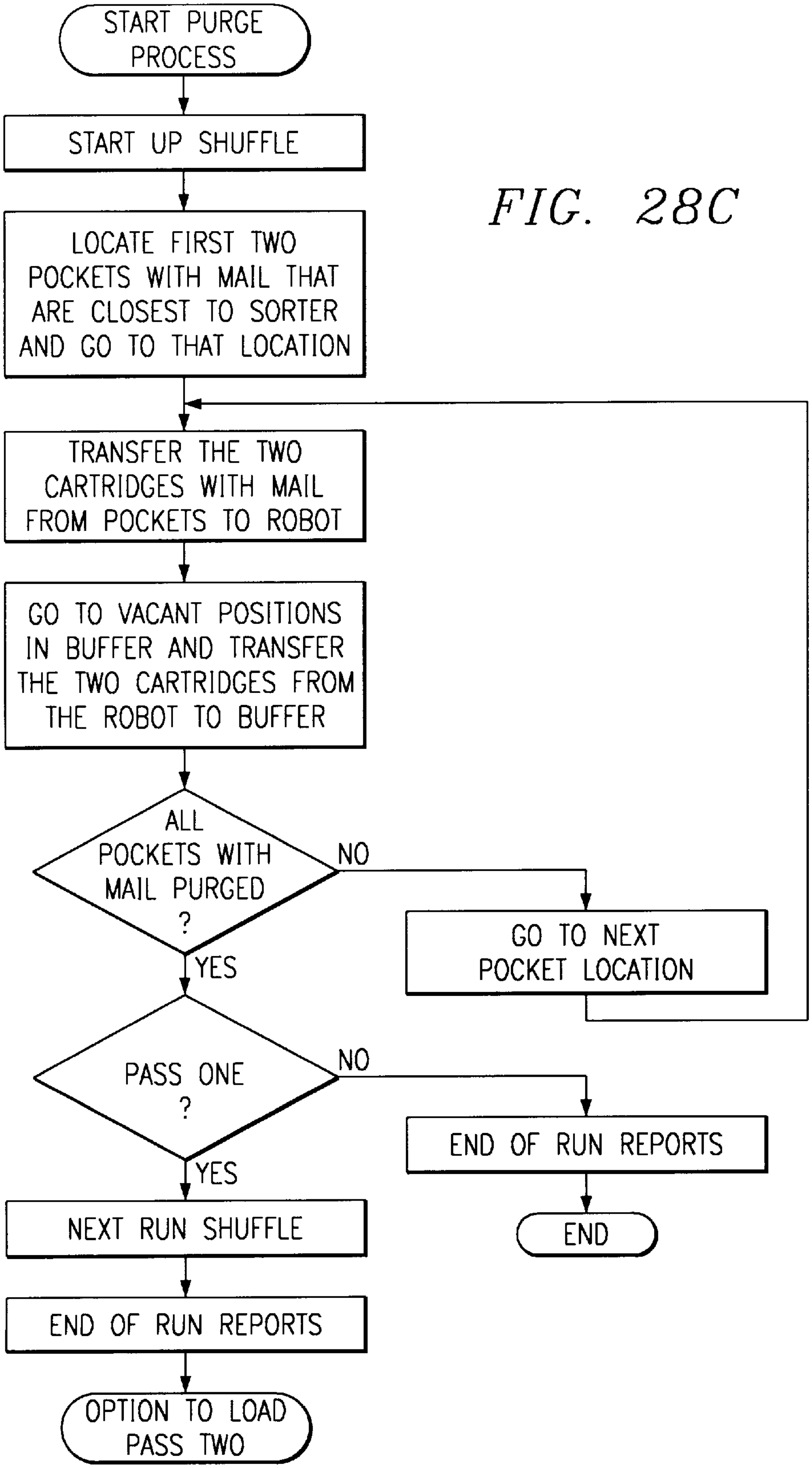
FIG. 28C is a flow chart describing the purge process in accordance with a preferred embodiment of the present invention.
Figure 28D:
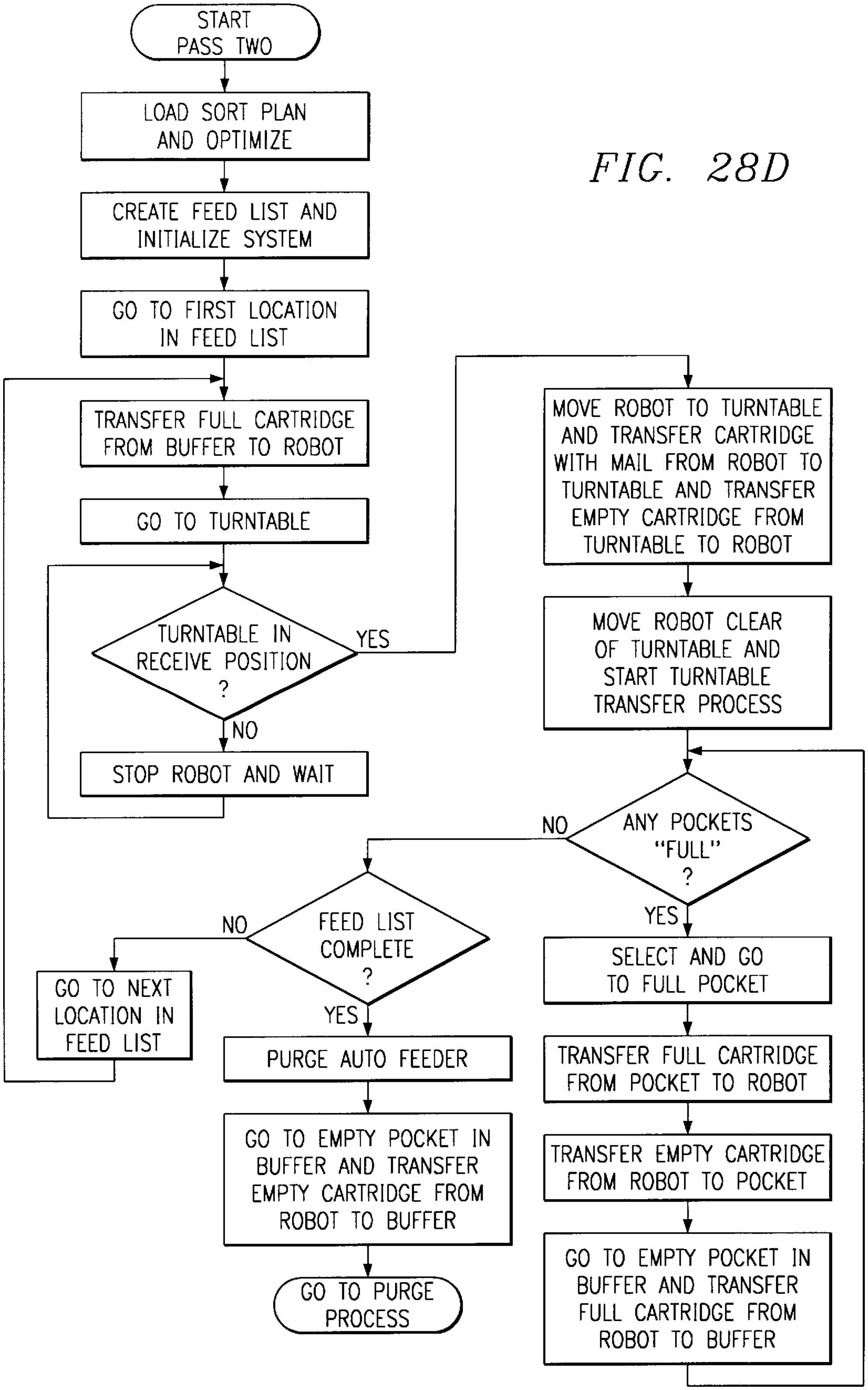
FIG. 28D is a flow chart describing the pass two sorting process in accordance with a preferred embodiment of the present invention.

Now referring to FIG. 28B, the flow chart describing the pass one re-feed process in accordance with a preferred embodiment of the present invention is described. The re-feed process begins in block 830. The system determines whether an mail is in the overflow or rejected pockets in block 832. If there is no mail in these pockets, the auto feeder is purged in block 834 and the system goes to the purge process in block 836. The auto feeder is purged by processing all the mail in the queue. Normally, a certain amount of mail is kept in the feeder buffer and is not processed unless more mail is placed in the buffer or the auto feeder is purged. FIG. 28C describes the purge process in accordance with a preferred embodiment of the present invention, and FIG. 28D is a flow chart describing the two pass sorting process in accordance with a preferred embodiment of the present invention.

These processes facilitate sorting of mail to a given postal delivery zone by a series of two or more sorts designed to arrange mail in cartridges or groups of adjacent cartridges, where each group of 3 or so cartridges corresponds to mail to be delivered by an individual postal carrier. Within each such group, the mail is arranged by delivery route so that the mail for the first address on the route is at the front or top of the stack, the mail for the next address follows next, and so on.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A method for sorting flat articles according to a sort plan, comprising the steps of:

feeding flat articles to be sorted into an automated sorting machine which scans each article;

routing the flat articles from the sorter one at a time to a stacker module which has a series of stacker interface mechanisms releaseably securable to cartridges for receiving the flat articles;

diverting each flat article into a destination cartridge according to the sort plan, forming a stack of articles in each cartridge as additional articles are sent diverted to each cartridge;

whenever one of the removable cartridges is substantially full, determining a new destination cartridge for articles that would otherwise have been sorted to the full cartridge and ceasing to divert articles to the full cartridge, removing the full cartridge and transporting it to a buffer rack, and replacing an empty cartridge into the stacker interface from which the full cartridge was removed.

2. The method of claim 1, further comprising repeating all of the steps until all of the flat articles have been sorted.

3. The method of claim 2, further comprising, after all of the flat articles have been sorted, a purge step of removing all of the cartridges from the stacker interface to the buffer rack.

4. The method of claim 1, wherein the diverting step comprises opening a sweep gate of the stacker interface so that the flat article is positioned on one side of a horizontal stack within the cartridge.

5. The method of claim 4, wherein the cartridge has a movable stack support therein which moves rearwardly as additional articles are added to the stack in that cartridge.

6. The method of claim 4, wherein the step of removing the full cartridge comprises:

closing the sweep gate so that no more articles are diverted to the full cartridge; and closing a movable gate at one end of the cartridge during removal of the cartridge from the stacker interface to retain the stacked articles in the cartridge.

7. The method of claim 6, wherein the step of replacing an empty cartridge comprises:

opening the movable gate at one end of the cartridge during insertion of the cartridge into the stacker interface so that the cartridge can receive articles therein.

8. The method of claim 1, wherein the flat articles comprise mail pieces and the sort plan comprises a postal sorting scheme.

9. The method of claim 1, wherein the steps of removing the full cartridge and replacing an empty cartridge into the stacker interface from which the full cartridge was removed are carried out using a robot having a pair of mail cartridge handlers positioned side by side and capable of carrying two cartridges at a time, which robot transports cartridges between the buffer rack and the stacker module.

* * * * *